United States Patent [19]
Ikemori

[11] Patent Number: 5,319,405
[45] Date of Patent: Jun. 7, 1994

[54] CAMERA SYSTEM

[75] Inventor: Keiji Ikemori, Kanagawa, Japan

[73] Assignee: Canon Kabushiki Kaisha, Tokyo, Japan

[21] Appl. No.: 882,249

[22] Filed: May 8, 1992

Related U.S. Application Data

[63] Continuation of Ser. No. 558,676, Jul. 27, 1990, abandoned.

[30] Foreign Application Priority Data

| Jul. 28, 1989 | [JP] | Japan | 1-196194 |
| Jul. 28, 1989 | [JP] | Japan | 1-196195 |
| Jul. 28, 1989 | [JP] | Japan | 1-196196 |
| Jul. 28, 1989 | [JP] | Japan | 1-196197 |
| Jul. 28, 1989 | [JP] | Japan | 1-196198 |
| Jul. 28, 1989 | [JP] | Japan | 1-196199 |
| Jul. 28, 1989 | [JP] | Japan | 1-196200 |
| Jul. 28, 1989 | [JP] | Japan | 1-196201 |
| Jul. 28, 1989 | [JP] | Japan | 1-196202 |
| Nov. 24, 1989 | [JP] | Japan | 1-196293 |

[51] Int. Cl.$^5$ .......................................... G03B 19/12
[52] U.S. Cl. .................................... 354/155; 354/219
[58] Field of Search ............... 354/152, 153, 154, 155, 354/156, 157, 158, 195.12, 219, 403, 404, 405, 406

[56] References Cited

U.S. PATENT DOCUMENTS

| 4,429,966 | 2/1984 | Hosoe et al. | 354/406 |
| 4,451,129 | 5/1984 | Ikari et al. | 354/195.12 X |
| 4,704,022 | 11/1987 | Nozawa et al. | 354/219 |
| 4,757,372 | 7/1988 | Betensky et al. | 354/195.12 X |

FOREIGN PATENT DOCUMENTS 63-156480 6/1988 Japan.
64-13532 1/1989 Japan.

Primary Examiner—Michael L. Gellner
Assistant Examiner—Howard B. Blankenship
Attorney, Agent, or Firm—Fitzpatrick, Cella, Harper & Scinto

[57] ABSTRACT

A camera system comprising a group of lenses arranged on a common first optical axis, a photographic lens including at least one movable lens member on a second optical axis and having an image plane, a main reflex mirror arranged on forward movement of the movable lens to be inserted into a space behind it on the second optical axis so that the optical axis of the photographic lens is bent, and a supplementary reflex mirror for reflecting the light beam from the main reflex mirror to the lens group.

24 Claims, 28 Drawing Sheets

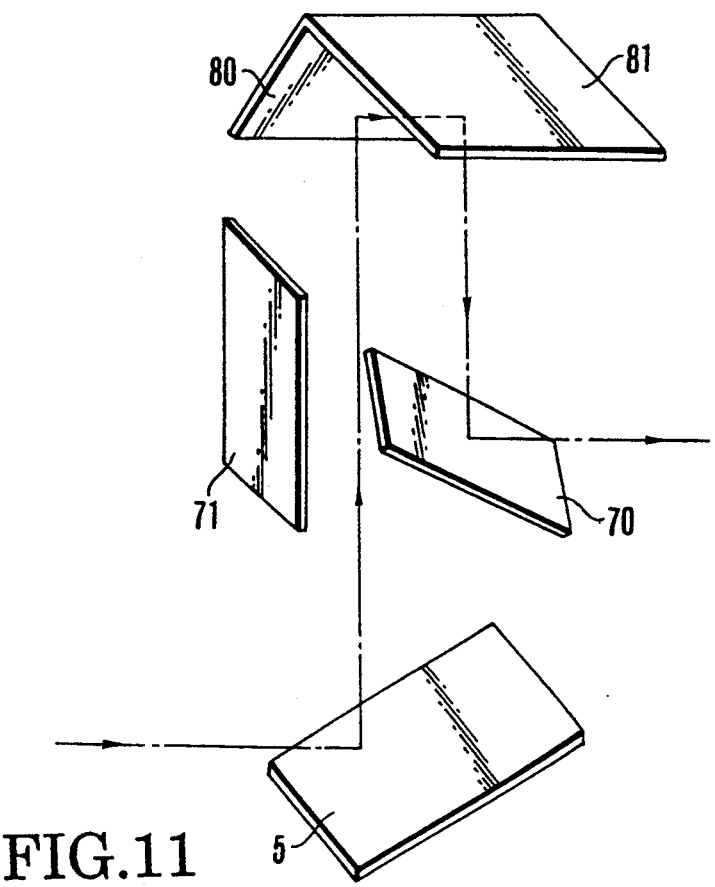
FIG.11
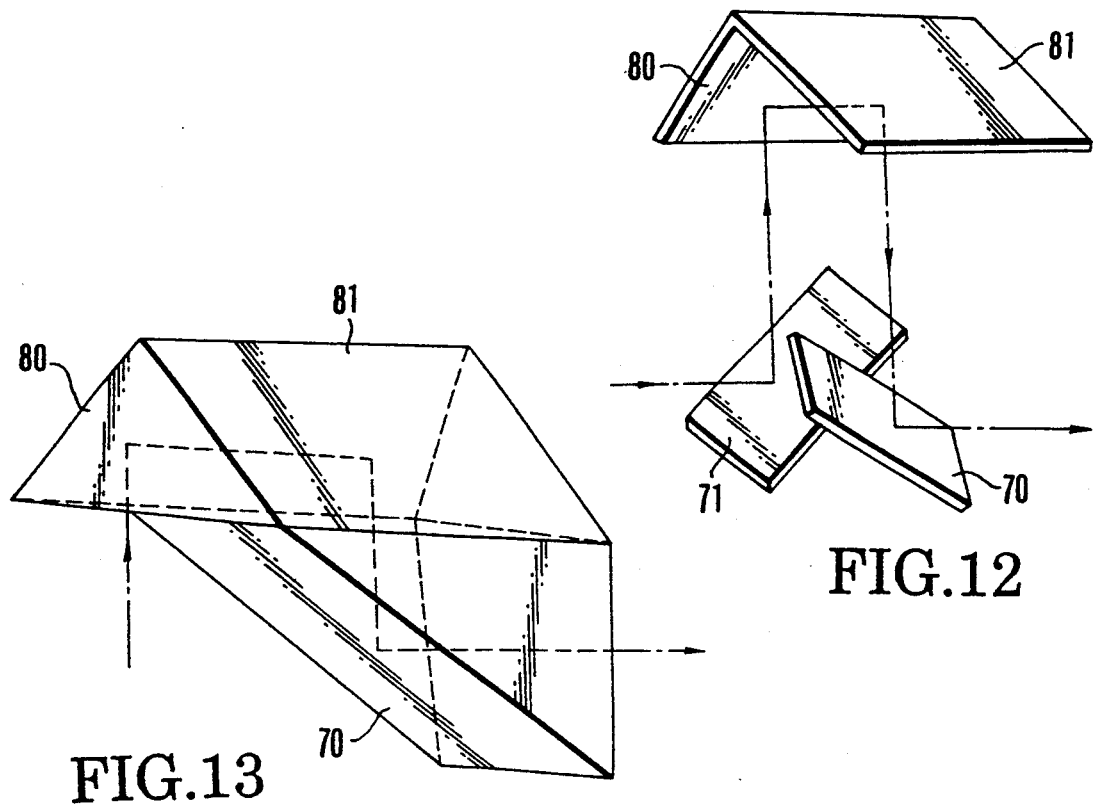
FIG.12
FIG.13

CAMERA SYSTEM

This application is a continuation of application Ser. No. 07/558,676 filed Jul. 27, 1990, now abandoned.

BACKGROUND OF THE INVENTION

1. Field of the Invention

This invention relates to cameras which have made full use of the feature that the photographic lens has an axially movable lens such as a zoom lens and, more particularly, to optical systems which, though getting the camera imparted with a plurality of functions, enable the size of the camera to be minimized.

2. Description of the Related Art

Recently, technology is rapidly developing. Accordingly, cameras have many functions in an increasing variety of forms, and their use is being widely spread.

These may be classified by the type of finder used therein. According to this classification, the cameras are divided into two groups, one of which has the TTL (Through-The-Lens) type finder, so-called single-lens reflex cameras, and the other of which has the external type finder, so-called lens-shutter cameras. Another classification is based on the recording medium, giving cameras using a silver-halide film and video cameras using a CCD, or the like, photoelectric transducer means so that pictures have to be reproduced electrically.

In the former classification, the camera having the TTL type finder is free from the finder parallax because the photographing system and the observing system have a common optical axis. This constitutes a feature that, regardless of what values the object distance and the focal length take, exactly the same field of view as that seen in the finder can be photographed on the photosensitive surface (film surface).

Also, the photographing system forms a primary image whose frame is of almost the same size as that of the picture frame on the photosensitive surface, giving an additional feature that a finder image can be observed in a large frame.

In the case of employing the TTL type of optical finder, however, the particular requirement is to dispose the quick-return mirror or like mirror between the photographic lens and the focal plane to bend the optical path to the observing system. Therefore, this space cannot be occupied by the photographic lens. For example, the camera system using 35 mm film has to spare an axial length of usually 37–40 mm.

For this reason, the photographic lens must be designed always with the back focal distance assured to be more than a predetermined value. Hence, it has a tendency to increase the bulk and size of not only the photographic lens but also the camera as a whole.

The lens-shutter camera, on the other hand, has no requirement of providing a space for disposing a quick-return mirror. So, the back focal distance may be short at any rate provided the last lens surface does not come into contact with the photosensitive surface (focal plane). Hence, it has the advantage of achieving a minimization of the size of the lens itself and the whole camera.

Because the photographing system and the observing system have, however, different optical axes from each other, there exists a finder parallax.

Particularly when the focal length increases, the amount of parallax error compared to the film rapidly increases to an actually unacceptable level, and even more so when shortening of the object distance occurs simultaneously.

Meanwhile, in the latter classification, the camera which reproduces a record by using film, because the reproducibility of the image information is good owing to the film whose resolution is generally high, has a feature that it is well adapted to snap shots for recording.

However, the use of the film as the recording medium gives the reproducing method problems that the reproduction is limited to still pictures and that, because of the necessity of the developing process, it lacks instantaneity.

The electrical recording and reproducing method, on the other hand, obviates the necessity of carrying out the developing process. But, because the number of picture elements available in the photoelectric transducer means is relatively small, the quality of the reproduced image information is not always high enough, giving a problem that, for a given quality, the enlarging magnification to which, for example, a still picture is reproduced by expanding the image information for one field must be limited.

On account of such problems, for example, Japanese Laid-Open Patent Application No. Sho 63-156480 proposes a camera having a photographic lens for film photography and another photographic lens for video photography arranged independently of each other. This has a problem that the entirety of the apparatus has a large size, which would sacrifice the portability.

Particularly when a zoom lens is used as the photographic lens, as it implies that the two zoom lenses are positioned side by side, the problem of increasing the size of the whole camera not only becomes serious but also there arises an additional problem of increasing the complexity of the structure of the camera.

Also, Japanese Laid-Open Patent Application No. Sho 64-13532 proposes a device for selectively directing the image formed by one photographic lens to the film and an image pickup element by using a reflection mirror. But the use of the reflection mirror behind the photographic lens necessitates the creation of a long back focal distance in designing the photographic lens, as has been described before. Therefore, similar problems arise that the total length of the lens tends to get too long and that the camera itself is unavoidably of large size.

SUMMARY OF THE INVENTION

A first object of the invention is to provide a camera system which minimizes the above-described problems as much as possible by making full use of the feature that the photographic lens has movable components arranged on, for example, variation of the focal length, or setting for macro photography, to move along an optical axis, especially that the photographic lens has its last component move to the object side, A second object of the invention is to provide a camera system which, when set for telescopic photography or for macro photography, compensate for parallax by utilizing the above-described feature.

A third object of the invention is to provide a camera system which utilizes this feature of the photographic lens also in making it possible to selectively shoot both still pictures and video pictures.

These and other objects will be apparent from the following description of embodiments of the invention by reference to the drawings.

BRIEF DESCRIPTION OF THE DRAWINGS

FIG. 11 is a perspective view of a mirror arrangement for the TTL finder in the embodiment shown in FIGS. 10(A) and 10(B).

FIG. 12 is a perspective view of another mirror arrangement for the external finder in the embodiment shown in FIGS. 10(A) and 10(B).

FIG. 13 is a perspective view of a prism in replacement of the mirrors of FIG. 11.

Figure 1A:
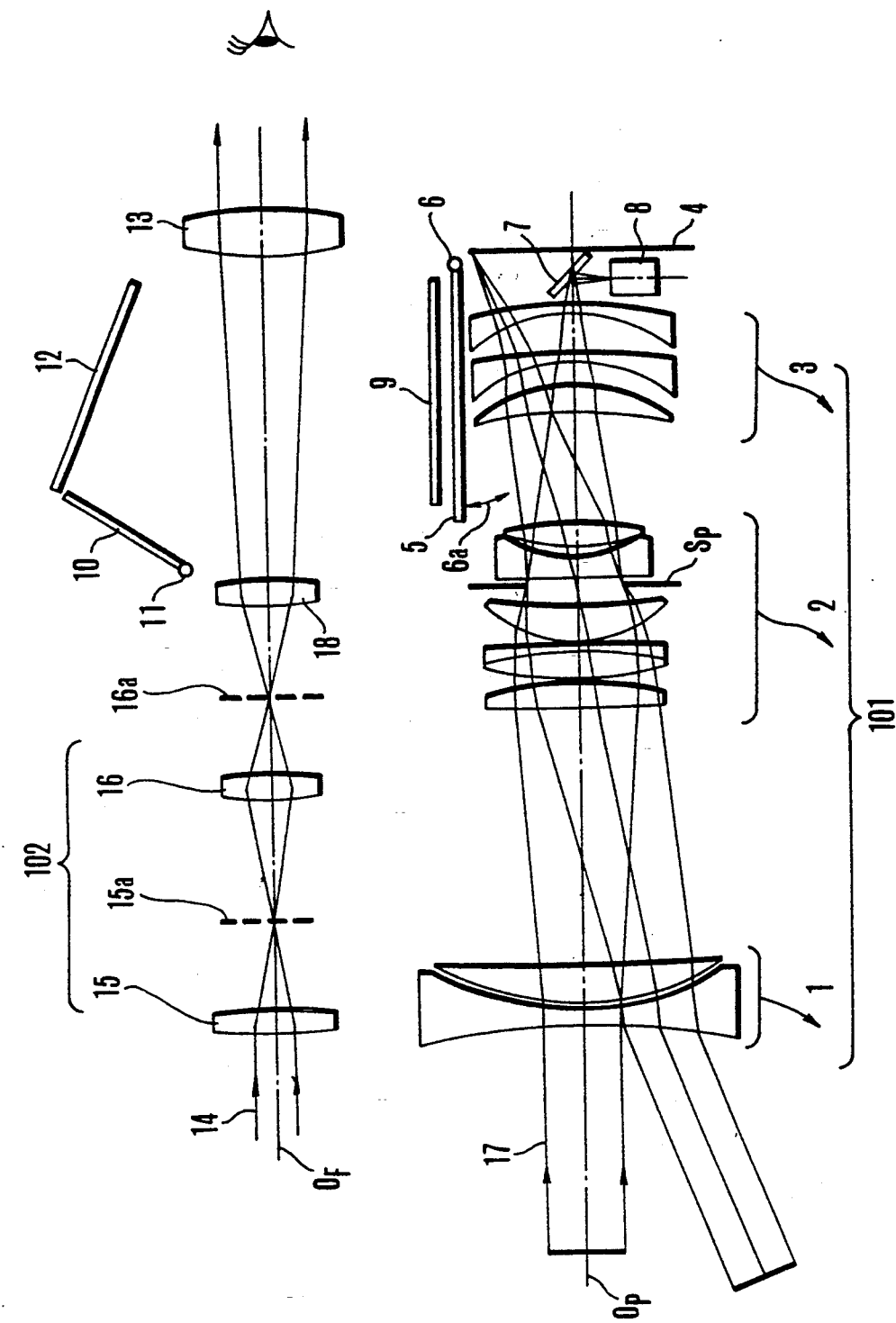
FIGS. 1(A) and 1(B) are diagrams illustrating the longitudinal section of lenses for a camera system concerning the invention with geometries of optical paths therethrough, particularly FIG. 1(A) being a diagram of the optical paths when the focal length is in the wide-angle end and FIG. 1(B) being a diagram of the optical paths when the focal length is in the telephoto end.
Figure 1B:
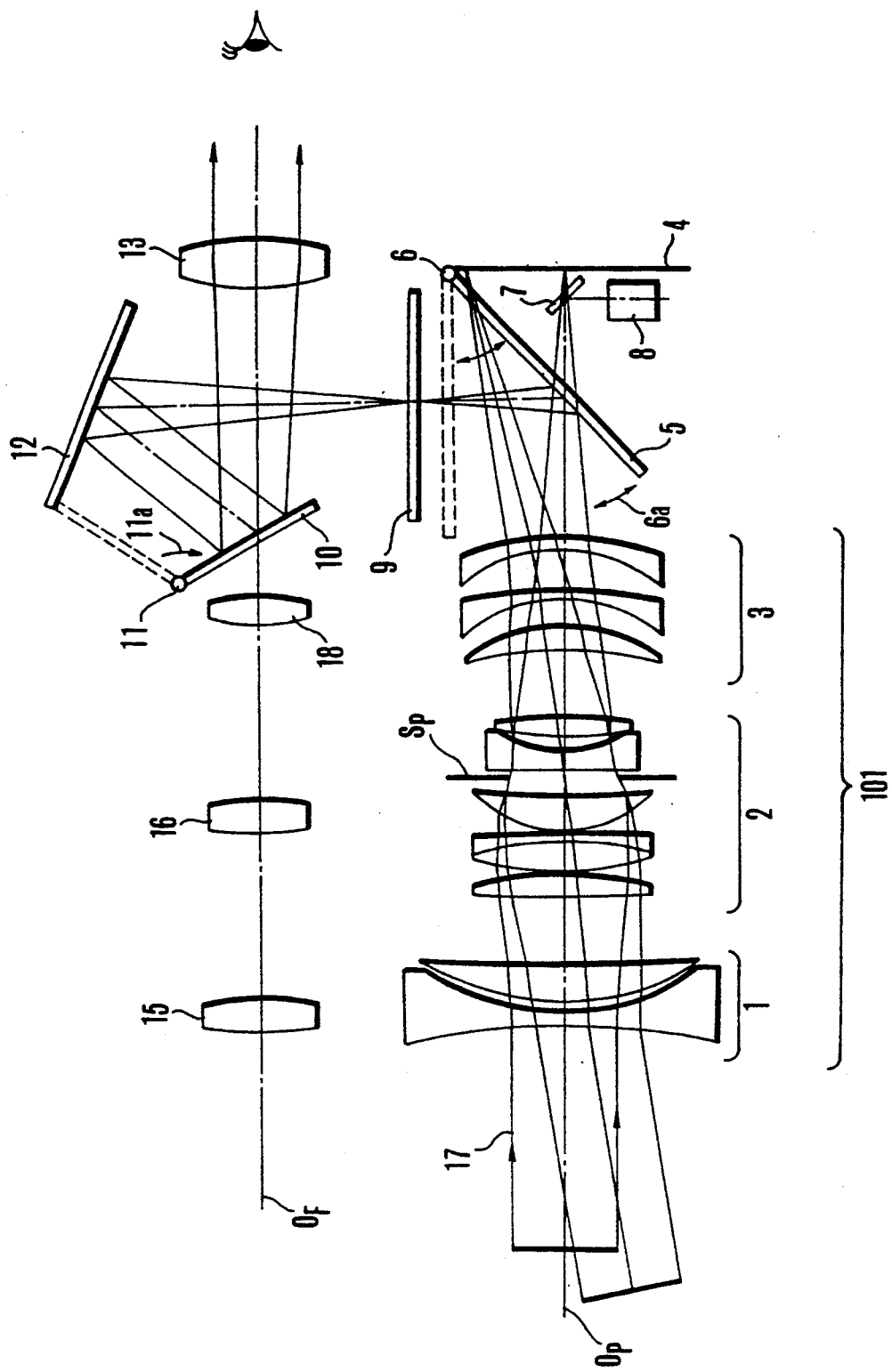

Detailed Description of the Preferred Embodiments:

FIG. 1(A) and FIG. 1(B) are schematic diagrams of the main parts of the optical system of a first embodiment of a camera system according to the invention. FIG. 1(A) is also a diagram of geometry to show the optical paths through a photographic (objective) lens 101 in the form of a zoom lens when in the shortest focal length position (wide-angle end), and FIG. 1(B) is also a diagram of geometry to show the optical paths through the photographic lens 101 in the longest focal length position (telephoto end).

The photographic lens 101 collects a light beam 17 from an object (not shown) being photographed and forms an object image on a photosensitive surface (film plane) 4.

The photographic lens 101 for the present embodiment comprises, from front to rear, a first lens group 1 of negative refractive power, a second lens group 2 of positive refractive power and a third lens group 3 of negative refractive power, totaling three lens groups. When varying the focal length from the wide-angle end to the telephoto end, these three lens groups are moved axially all forward as indicated by arrows. And, the lens arrangement has a feature that, as is seen from FIGS. 1(A) and 1(B), the back focal distance gradually increases with zooming from the wide-angle end to the telephoto end. Incidentally, FIG. 1(B) shows an optical path through the observing system when set to the TTL form. SP stands for an aperture stop. Again, $O_P$ and $O_F$ represent the optical axes of the photographic lens and the finder, respectively.

A main reflex means comprises a mirror for reflecting mirror 7 reflects the axial light beam from the photographic lens 101 to an auto-focus unit 8. The auto-focus unit 8 is formed with a focus detecting device, for example, of the image shift type known to those skilled in the art.

A mirror 5 (M1) is rotatable about a pivot support point 6 in directions indicated by arrows 6a. When the mirror 5 is in an operative position of FIG. 1(B), an object image is formed on a focusing screen 9 by the photographic lens 101. A sub-reflex means comprises a rotatable mirror 10 and a fixed mirror 12. Rotatable mirror 10 (M3), when rotated about a pivot support point 11 in the direction of arrow 11a, enters the optical axis $O_F$ of the finder. A fixed roof mirror 12 (M2) and an eyepiece lens 13 constitute part of an observing system shown in FIGS. 1(A) and 1(B).

An objective lens 102 for observing an object image is arranged independently of the photographic lens 101. The objective lens 102 comprises a front lens group 15 having a positive refractive power to form a first object image on a primary image plane 15a with the use of a light beam 14, and an erector lens group 16 having a positive refractive power to re-focus the first object image formed on the primary image plane 15a to a second object image on a secondary image plane 16a, totaling two lens groups.

Incidentally, a diffusion plate may be disposed at the secondary image plane 16a. So, the second object image can be formed on that diffusion plate.

In the arrangement described above, when the photographic lens 101 is set in the shortest focal length position or wide-angle end as shown in FIG. 1(A), a first finder system is formed to observe the second object image formed on the secondary image plane 16a through a lens group 18 and the eyepiece lens 13. At this time, the mirror 10 (M3) is retracted from the optical path for observation, and the mirror 5 too is retracted from the optical path for photography.

For the telephoto setting, on the other hand, a TTL finder is formed as shown in FIG. 1(B) in such a way that the mirror 5 is inserted into a space that has been created by moving the third lens group 3 forward, and the mirror 10 too is inserted into the finder optical axis $O_F$, thus permitting the photographic lens 101 to form its image on the focusing screen 9. Further, this object image is observed through the roof mirror 12 and the mirror 10 by the eyepiece lens 13 for viewing at the eye level. It is to be noted that the mirror 10 serves to shut off the light from the lens group 18.

Incidentally, for reference, the photographic lens 101 is, as shown in a numerical example to be described later, in the form of a zoom lens whose focal length f varies in a range of 29 to 130 mm. For a first zooming region f=29-60 mm, the light beams 14 and 17 take the paths shown in FIG. 1(A). For a second zooming region f=60-130 mm, the light beam 17 takes the path shown in FIG. 1(B).

That is, in the present embodiment, when the photographic lens is on the shorter focal length side, or in the shortest to the standard focal length positions where the amount of finder parallax error is small, the camera system takes the twin-lens form with the photographing system and the observing system operating independently of each other. This allows the back focal distance of the photographic lens to become as short as possible. Thus, priority is laid on the minimization of the size of the whole lens system.

It should be explained in this connection that with the observing system left unchanged from the first form, when an object, particularly a close one, is observed at a long focal length, a very large parallax takes place. In the present embodiment, for the telephoto setting of the photographic lens 101, therefore, the observing system is changed to the TTL form by putting the mirrors 5 and 10 into the respective operative positions as the optical paths are cleared in response to movement of the third lens group 3, so that the light entering through the photographic lens 101 is brought to the eyepiece lens 13 by the mirrors 5, 12 and 10. Thus, this parallax is prevented from occurring. Incidentally, it is of course certain in both forms of the observing system that the image to be observed through the eyepiece lens 13 is an erected non-reverse, or correct one.

And, the photosensitive surface is exposed to the light from the photographic lens 101 when a shutter (not shown) just in front of it is opened. On the telephoto side, when making an exposure, the mirror 5 is taken out of the photographing optical path, of course.

It is to be noted that in the present embodiment the mirror 5 may be made half-mirrored in a central portion of such size that the axial light beam passes through the mirror 7 and therefrom is reflected to the auto-focus unit 8.

Thus, in the present embodiment, the camera system is made for actual use to be a TTL single-lens reflex camera. Nevertheless, the size of the whole camera is reduced to almost the same order as the bifocal length lens built-in compact camera.

As has been described above, according to the present embodiment, it is made possible to use a zoom lens of high range of focal lengths f=29-130 mm, and a reduction of the total length (the distance from the front vertex to the image plane) in the wide-angle end to about 88 mm or less has been achieved. Nonetheless, the camera system still retains an equivalent capability to the TTL finder and further maintains a possibility of getting the TTL auto-focus function to be achieved.

A numerical example of the photographic lens 101 of the present embodiment is shown in the following table, where Ri is the radius of curvature of the i-th lens surface, counting from front, Di is the axial lens thickness or air separation, counting from front, and Ni and $\nu$i are the refractive index and Abbe number of the glass of the i-th lens element, counting from front, respectively. "b.f." stands for the back focal distance.

| Numerical Example 1 | | | |
|---|---|---|---|
| F = 29-130 FNo = 1:3.5-8 2ω = 73.4°-18.9° | | | |
| R1 = -77.07 | D1 = 1.50 | N1 = 1.88300 | ν1 = 40.8 |
| R2 = 29.44 | D2 = 1.00 | | |
| R3 = 31.42 | D3 = 4.00 | N2 = 1.75604 | ν2 = 25.0 |
| R4 = 357.03 | D4 = Variable | | |
| R5 = 39672.43 | D5 = 2.60 | N3 = 1.49700 | ν3 = 81.6 |
| R6 = -47.44 | D6 = 0.16 | | |
| R7 = 36.47 | D7 = 3.06 | N4 = 1.51742 | ν4 = 52.4 |

-continued

| | | | |
|---|---|---|---|
| R8 = −44.83 | D8 = 1.02 | N5 = 1.84666 | ν5 = 23.9 |
| R9 = −296.19 | D9 = 0.15 | | |
| R10 = 14.08 | D10 = 3.60 | N6 = 1.61700 | ν6 = 62.8 |
| R11 = 59.97 | D11 = 2.50 | | |
| R12 = Stop | D12 = 0.70 | | |
| R13 = −162.46 | D13 = 2.04 | N7 = 1.83400 | ν7 = 37.2 |
| R14 = 13.69 | D14 = 1.22 | | |
| R15 = 27.89 | D15 = 2.60 | N8 = 1.62045 | ν8 = 38.1 |
| R16 = −33.64 | D16 = Variable | | |
| R17 = −47.63 | D17 = 3.00 | N9 = 1.59270 | ν9 = 35.3 |
| R18 = −18.09 | D18 = 2.44 | | |
| R19 = −17.40 | D19 = 1.20 | N10 = 1.72916 | ν10 = 54.7 |
| R20 = −62.93 | D20 = 4.33 | | |
| R21 = −16.74 | D21 = 1.20 | N11 = 1.48749 | ν11 = 70.2 |
| R22 = −36.60 | | | |

| Lens Separations during Zooming | | | |
|---|---|---|---|
| Focal Length | D4 | D16 | b.f. |
| 29 | 27.49 | 11.81 | 5.70 |
| 65 | 7.52 | 6.86 | 29.35 |
| 130 | 0.96 | 1.16 | 78.05 |

Figure 2A:
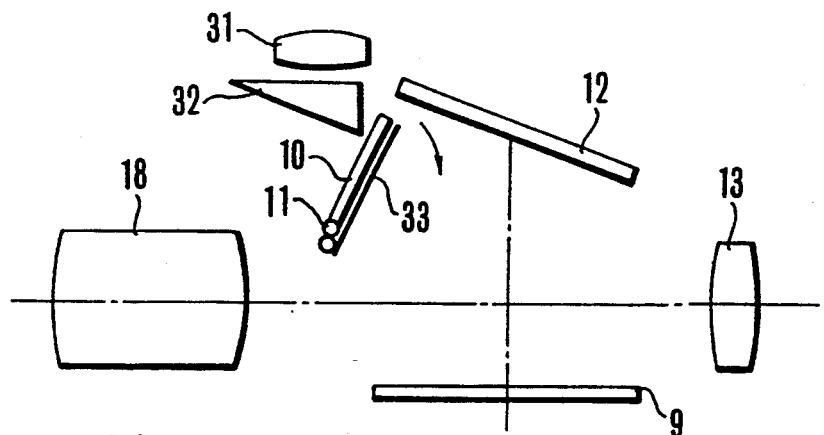
FIGS. 2(A), 2(B) and 2(C) are sectional views of mirror arrangements forming a finder, FIG. 2(A) showing an operative position for the external finder, FIG. 2(B) showing another operative position for the TTL finder making it possible to view at the eye level and FIG. 2(C) showing still another operative position for the TTL finder making it possible to view at the waist level.
Figure 2B:
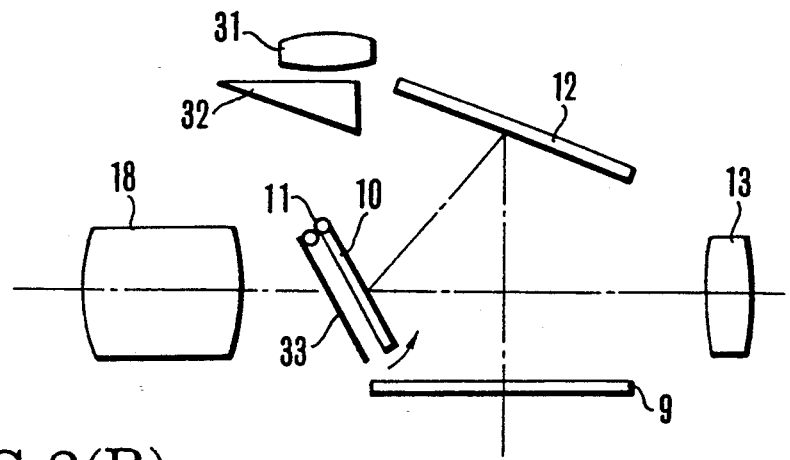
Figure 2C:
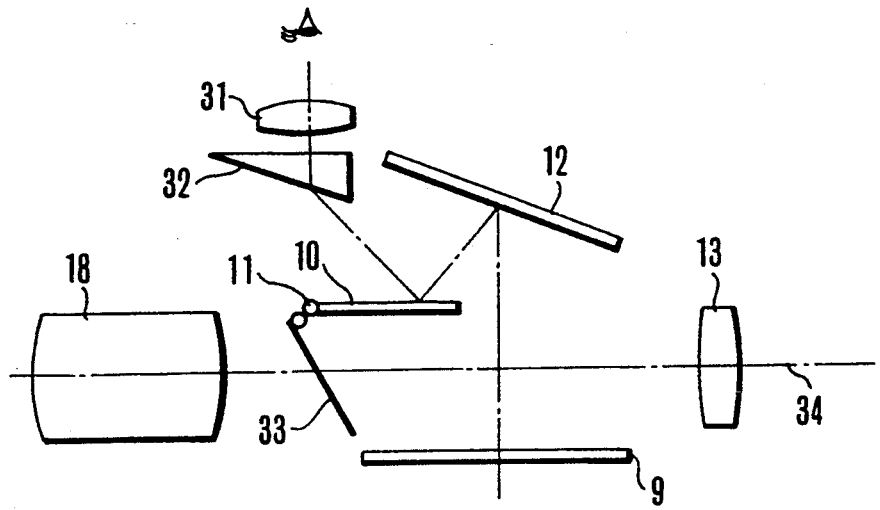

FIGS. 2(A), 2(B) and 2(C) are sectional views of the eyepiece lenses and their neighbor parts of the observing system of a second embodiment of the invention in different operative positions.

Whilst, in FIG. 1(B), the embodiment has been made to observe the object image from the only one direction of the eye level, the next embodiment has a feature that the object image can be observed even from another direction of the waist level too.

FIG. 2(A) is in an operative position for observing the image formed by the lens 18 from the eye level through the eyepiece lens 13. FIG. 2(B) is in another operative position for observing the image formed by the photographic lens 101 from the eye level through the eyepiece lens 13. These are similar to those of the observing system of FIGS. 1(A) and 1(B).

FIG. 2(C) is in still another operative position for observing the image formed by the photographic lens 101 from the waist level.

In FIG. 2(A), a rotatable light shielding member 33 is positioned adjacent to the rotatable mirror 10 to prevent the reflected light from the roof mirror 12 from entering the eyepiece lens 13. By this, only the light beam from the lens unit 18 is allowed to reach the eyepiece lens 13 when one is observing from the eye level.

The mirror 10 and the light shielding member 33 are then turned from the positions of FIG. 1(A) to a direction indicated by an arrow and arranged as shown in FIG. 2(B).

Thereupon, the light beam from the roof mirror 12 is made to reflect from the mirror 10 to the eyepiece lens 13 so that the object image formed on the focusing screen 9 is observed from the eye level. At this time, the light shielding member 33 performs the function of shutting off the light beam from the lens unit 18.

Then, from the position of FIG. 2(B), the mirror 10 only is turned, or as viewed from FIG. 2(A), the light shielding member 33 and the mirror 10 are turned to be at different angles from each other, and the mirror 10 is arranged in parallel to the optical axis 34 for observation, as shown in FIG. 2(C). Thereupon, the light beam from the focusing screen 9 is reflected from the roof mirror 12 and the mirror 10 in sequence and, after having been deflected in a correct direction by a prism 32, reaches an eyepiece lens 31 for waist level. Thus, observing from the direction of the waist level becomes possible.

According to the present embodiment, the light beam is once directed forward by the mirror 10. This produces a feature that the field of view of the finder can be large without interfering with the roof mirror 12.

It should be noted that as the zoom lens relevant to the invention, besides the 3-zoom component type shown in FIG. 1(A) and 1(B), any other types of zoom lenses can be used. For example, the zoom lens comprising, from front to rear, a first lens group of negative power and a second lens group of positive power, totaling two lens groups, both of which are moved to vary the focal length, too is even usable. Also, the zoom lens comprising a first lens group of positive power and a second lens group of negative power, totaling two lens groups, both of which are moved to vary the focal length, is applicable as well.

In any case of the zoom lenses, for a zooming region where the back focal distance becomes longer (a telephoto side region), the observing system is switched to the TTL mode, thereby producing similar advantages to those described before.

According to the invention, as, in the photographic system having the zoom section, the zooming range is divided into two regions, the observing system is constructed in the forms corresponding to the zooming regions, as has been described before and a mechanism of simple structure suffices for changing it over between these forms. When the shorter focal length regions is selected, the photographic lens is combined with the twin-lens type observing system to constitute the camera system, while when the longer focal length region is selected, the photographic lens is combined with the TTL single-lens type observing system to constitute the camera system. Hence, it is made possible to provide the camera system with the functions of the TTL single-lens reflex camera as viewed in the aspect of actual use, while still permitting reduction of the size of the whole camera to as small a level as the bifocal length changeable compact camera to be achieved.

It is now noted that, in the foregoing embodiments, the image angle that is determined by the size of the picture frame and the focal length of the photographic lens 101, that is, in the present embodiment, the zoom lens 101, has covered 2ω=73.4°-18.9°. For the next embodiment, the zoom ratio of the photographic lens is left unchanged, yet the usable format of the film is limited like the known trimming photography, thus providing a camera system capable of producing an apparently more telephoto effect. And, in this case, when zooming across the boundary between the two regions, the image is continuously enlarged or contracted. Incidentally, reference is made to FIGS. 1(A) and 1(B).

In the present embodiment, for the operative position of FIG. 1(A), or in the photographic lens with the mirror 5 out of the light beam emerging from it, the zooming range to be used is set to f=29-70 mm. This corresponds to an image angle range of 73.4°-34.3°.

When the photographing system is on the shorter focal length side, that is, when the first zooming range from the wide-angle end to the standard focal length is selected, the amount of finder parallax error is small. In the present embodiment, therefore, the photographic lens and the finder in the camera system are formed independently of each other, or into the twin-lens type with an advantage of shortening the back focal distance of the photographic lens as far as possible. Thus, priority is laid on the minimization of the size of the whole lens system.

Meanwhile, when rendering the photographic lens 101 operative on the longer focal length side, or in a second range from the standard to the telephoto end, all the lens groups of the photographic lens 101 are first moved from their positions of FIG. 1(A) toward the object side to thereby create a space, and the mirror 5 is then put into that space. It should be noted here that the focal length range of the photographic lens 101 in this condition is set to f=50-130 mm. And, when this second zooming range is selected, the film format of about 0.7 times smaller size than that for the first zooming range (trimming photography) is put into use. Thus, the photographic lens can get image angles of 34°-13.4°. Incidentally, for f=50 mm, the back focal distance takes a value of about 20 mm.

Hence, the photographic lens can continuously vary the image angle from 73.4° to 13.4°. Over this range, the image magnification varies 6.35 times. (This means that the maximum focal length is 184 mm.)

A feature which is particularly characteristic of the present embodiment is that when the TTl finder mode operates, or the second zooming range is in use, the film format is decreased in size as has been described. This produces an advantage of providing a possibility of further reducing the size of the entire system, because a system from the mirror 5 to the roof mirror 12 may be of smaller size.

Whilst, in the foregoing embodiments, the front lens group 15 and erector lens group 16 in the finder, which lie on the optical axis $O_F$, are always axially fixed, they may otherwise be arranged to zoom similarly to the photographic lens. In this connection, an embodiment is next shown in FIGS. 3(A) and 3(B). To further shorten the total length of the external finder system, an additional embodiment is also described.

Incidentally, since the members denoted by the same numerals as those described above fulfill like functions, any more detailed description about them is omitted for the purpose of clarity.

A first observing system along the finder optical axis $O_F$ has the front lens group 15 and the erector lens group 16 made to move at loci indicated by arrows to effect zooming until this first finder system is taken out of use, in other words, the mirror 5 is put into the photographing light beam.

For this mode, the photographic lens 101 in a numerical example to be described later varies its focal length within a range of f=29.1-58.62 mm, while the mirror 7 is simultaneously retracted from the photographic optical path.

Meanwhile, in the first observing system, by utilizing the objective lens 102 and the eyepiece lens 13, an image of an object to be photographed or an object image on a diffusion plate, formed at a secondary image plane 16a is observed. The first observing system operates in a range of finder image magnifications $\beta=0.35-0.71$ with the image angle $2\omega=64.6°-35.2°$ (the view area compared to the film area: about 85%).

Figure 3A:
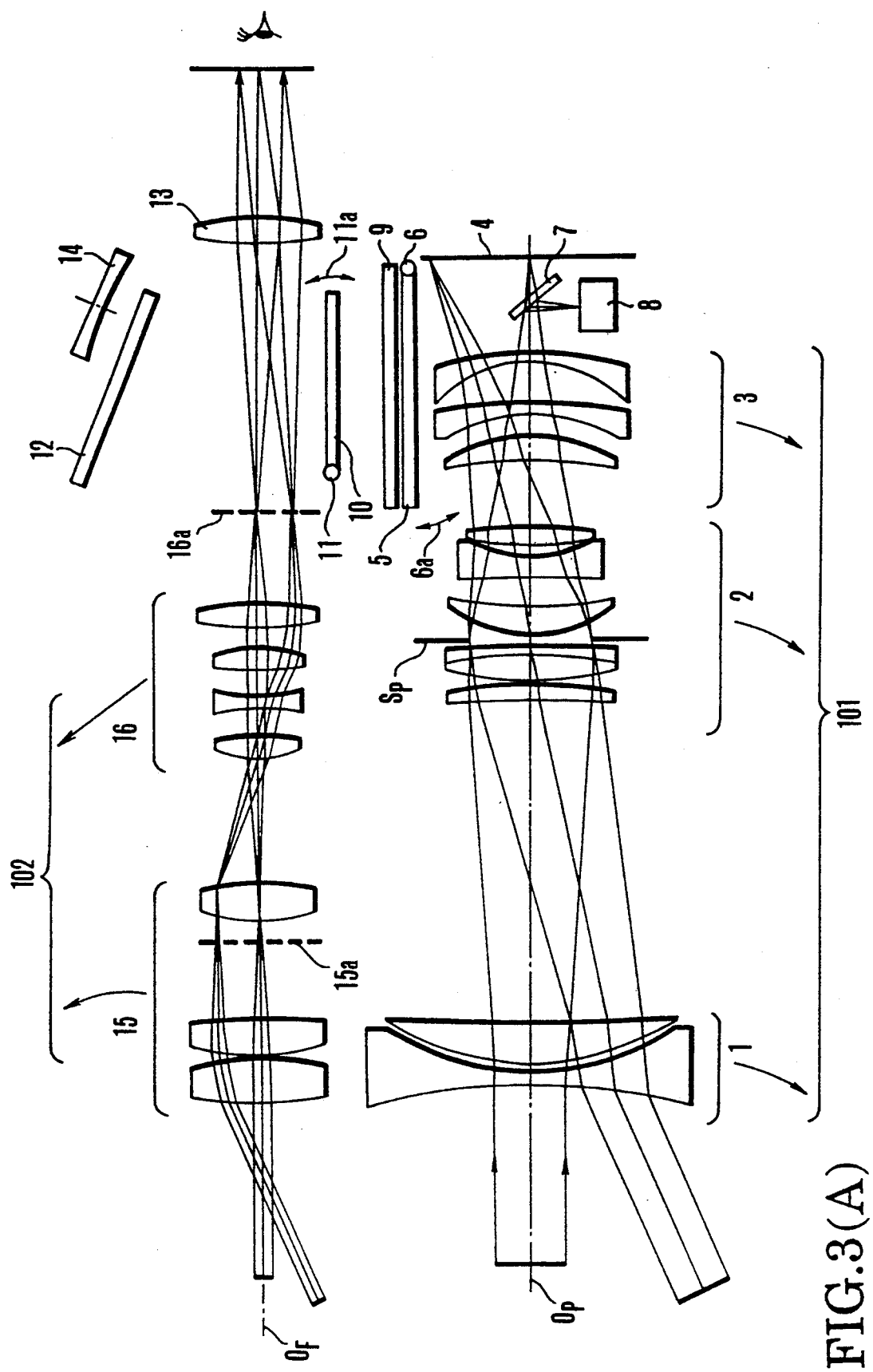
FIGS. 3(A) and 3(B) are diagrams illustrating the longitudinal section of lenses for another camera system concerning the invention with geometries of optical paths, particularly FIG. 3(A) being a geometry of the optical paths when the focal length is in the wide-angle end, and FIG. 3(B) being a geometry of the optical paths when the focal length is in the telephoto end.
Figure 3B:
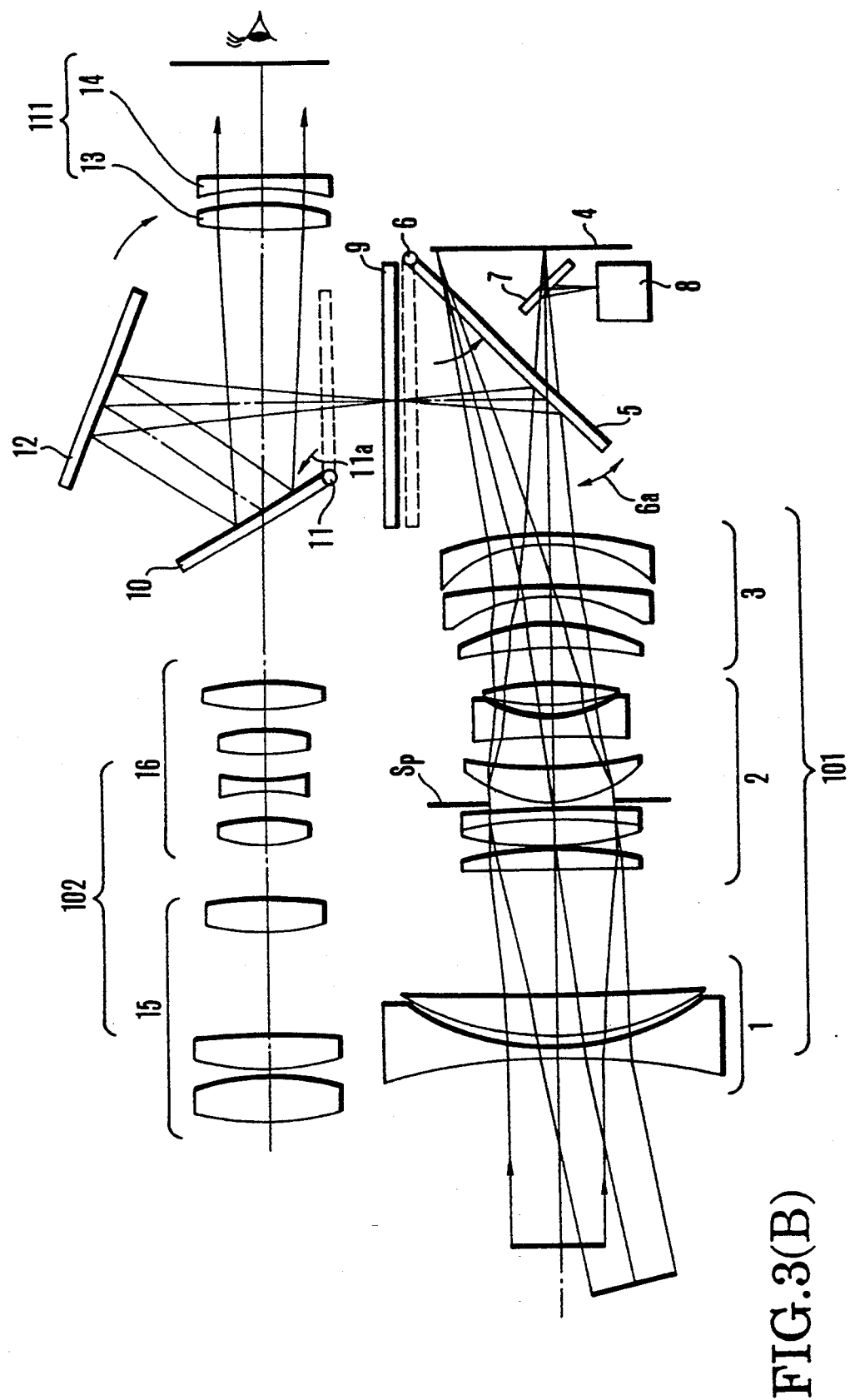

Next, in the present embodiment, for the focal lengths from the standard to the telephoto end, the photographic lens 101 is brought into use as part of a second observing system in the form of the TTL finder. To this end, all the lens groups of the photographic lens 101 are axially moved forward from their positions shown in FIG. 3(A) to thereby create a space, and the mirror 5 is inserted into, and seated in, a position as shown in FIG. 3(B). The thus-obtained second observing system or TTL finder in a numerical example to be described later varies its focal length from 58.62 mm to 131.79 mm. The back focal distance of the photographic lens 101 is 31.13 mm.

Along with the mirror 5, the other rotatable mirror 10 too is set in an operative position as shown in FIG. 3(B). Incidentally, because the back focal distance for the TTL mode is 31.13 mm, the mirror 5 can turn into the space behind the photographic lens 101.

Another feature of the present embodiment is that, unlike the above-described embodiment, the secondary image plane 16a is nearer to the eyepiece lens 13 with an advantage of shortening the physical length of the first observing system. Since, at this time, the first observing system and the second observing system, of which the latter is the TTL finder, form their respective images at different distances from the eyepiece lens 13, if either of these images is observed through the eyepiece lens of the same optical power, there would arise a discrepancy in diopter. On this account, in the present embodiment, when forming the TTL finder, a lens unit 14 of negative power is inserted behind, and set in axial alignment with, the eyepiece lens 13 in response to selection of the TTL finder mode. Thus, the diopter of the second observing system matches with that of the first one.

Next, a numerical example of the photographic lens and the first observing system of FIG. 3(A) of the present embodiment is shown in the following tables, where Ri is the radius of curvature of the i-th lens surface, counting from front, Di is the axial lens thickness or air separation, counting from front, and Ni and $\nu i$ are the refractive index and Abbe number of the glass of the i-th lens element, counting from front, respectively. "b.f." stands for the back focal distance.

It is to be noted that the photographic lens of the invention may include a non-zooming or fixed lens group just in front of the focal plane.

| Photographic Lens: | | | |
|---|---|---|---|
| $F = 29.1-131.79$ FNo $= 1:3.5-8$ $2\omega = 73.26°-18.64°$ | | | |
| R1 = −79.23 | D1 = 1.50 | N1 = 1.88300 | $\nu 1$ = 40.8 |
| R2 = 30.26 | D2 = 1.03 | | |
| R3 = 32.30 | D3 = 4.70 | N2 = 1.75604 | $\nu 2$ = 25.0 |
| R4 = 368.51 | D4 = Variable | | |
| R5 = 40780.69 | D5 = 2.20 | N3 = 1.49700 | $\nu 3$ = 81.6 |
| R6 = −48.77 | D6 = 0.16 | | |
| R7 = 37.49 | D7 = 3.14 | N4 = 1.51742 | $\nu 4$ = 52.4 |
| R8 = −46.08 | D8 = 1.05 | N5 = 1.84666 | $\nu 5$ = 23.9 |
| R9 = −304.46 | D9 = 0.50 | | |
| R10 = Stop | D10 = 0.30 | | |
| R11 = 14.40 | D11 = 3.70 | N6 = 1.61700 | $\nu 6$ = 62.8 |
| R12 = 61.65 | D12 = 3.20 | | |
| R13 = −167.00 | D13 = 2.09 | N7 = 1.83400 | $\nu 7$ = 37.2 |
| R14 = 14.08 | D14 = 1.26 | | |
| R15 = 28.67 | D15 = 2.67 | N8 = 1.62045 | $\nu 8$ = 38.1 |
| R16 = −34.36 | D16 = Variable | | |
| R17 = −48.96 | D17 = 3.08 | N9 = 1.59270 | $\nu 9$ = 35.3 |
| R18 = −18.59 | D18 = 2.50 | | |
| R19 = −17.89 | D19 = 1.23 | N10 = 1.72916 | $\nu 10$ = 54.7 |
| R20 = −64.69 | D20 = 4.45 | | |
| R21 = −17.20 | D21 = 1.23 | N11 = 1.48749 | $\nu 11$ = 70.2 |
| R22 = −37.62 | | | |

| Lens Separations during Zooming | | | |
|---|---|---|---|
| Focal Length | D4 | D16 | b.f. |
| 29.10 | 36.13 | 7.09 | 11.03 |
| 58.62 | 13.64 | 3.93 | 31.13 |
| 131.79 | 0.68 | 1.17 | 78.55 |

| First Observing System: | | | |
|---|---|---|---|
| (Magnification) = 0.35-0.71 $2\omega = 64.6°-35.2°$ | | | |
| R1 = 37.0 | D1 = 5.0 | N1 = 1.77250 | $\nu 1$ = 49.6 |
| R2 = −25.73 | D2 = 0.5 | | |
| R3 = 30.0 | D3 = 4.0 | N2 = 1.69680 | $\nu 2$ = 55.5 |

-continued

| | | | |
|---|---|---|---|
| R4 = −70.0 | D4 = 11.0 | | |
| R5 = 22.0 | D5 = 4.0 | N3 = 1.69680 | ν3 = 55.5 |
| R6 = −25.0 | D6 = Variable | | |
| R7 = 13.0 | D7 = 2.8 | N4 = 1.69680 | ν4 = 55.5 |
| R8 = −20.0 | D8 = 3.0 | | |
| R9 = −15.0 | D9 = 1.2 | N5 = 1.80518 | ν5 = 25.4 |
| R10 = 20.0 | D10 = 3.0 | | |
| R11 = 27.0 | D11 = 2.8 | N6 = 1.69680 | ν6 = 55.5 |
| R12 = −12.6 | D12 = 2.0 | | |
| R13 = 26.0 | D13 = 3.0 | N7 = 1.51633 | ν7 = 64.1 |
| R14 = −26.0 | D14 = Variable | | |
| R15 = 50.0 | D15 = 3.0 | N8 = 1.51633 | ν8 = 64.1 |
| R16 = −21.98 | D16 = 16.0 | | |

| Lens Separations during Zooming | | |
|---|---|---|
| β | D6 | D14 |
| 0.35 | 14.42 | 40.48 |
| 0.5 | 9.04 | 44.29 |
| 0.71 | 5.23 | 49.67 |

Figure 4A:
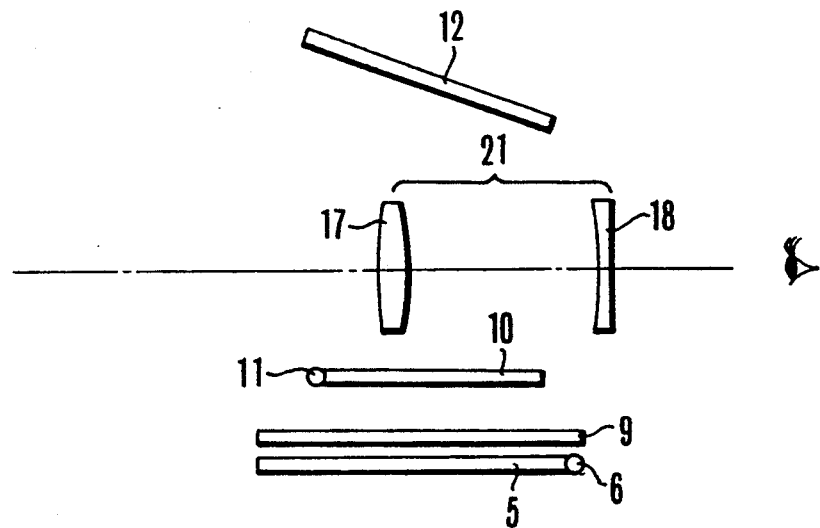
FIGS. 4(A) and 4(B) are diagrams illustrating the positions of an eyepiece lens and mirror arrangements for the external finder and the TTL finder.
Figure 4B:
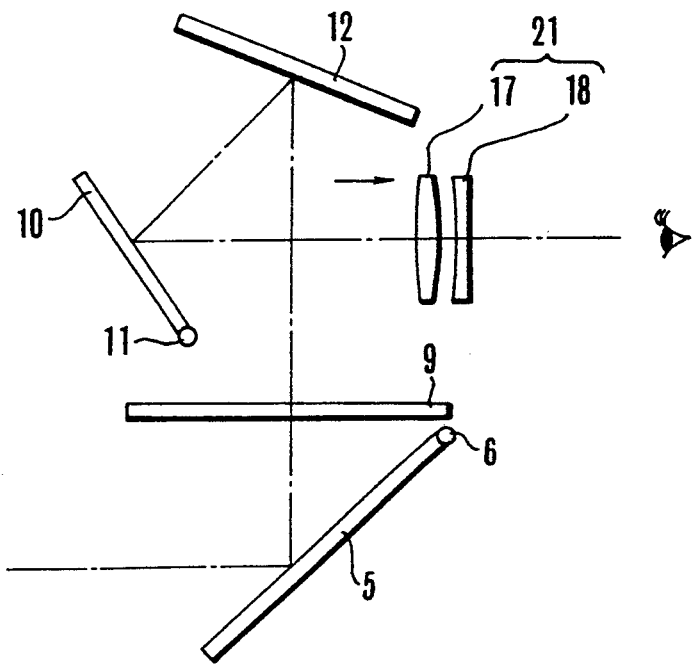

FIGS. 4(A) and 4(B) are longitudinal section views of the main parts of an optical system for observation of another embodiment of the camera system according to the invention. When the photographic lens is set to operate in the short focal length region, a first observing system, or when the photographic lens in the long focal length region, a second observing system, is established with the eyepiece lens 21 and its neighbor parts only shown in FIG. 4(A) or FIG. 4(B) respectively.

The required focal length for the eyepiece lens 21 tends to be longer when the second observing system of FIG. 4(B) operates than when the first observing system of FIG. 4(A) operates. From this reason, in the present embodiment, the eyepiece lens 21 is constructed from a lens 17 of positive power and a lens 18 of negative power. For the setting of FIG. 4(A), the axial separation between the lens 17 and the lens 18 is made wide so that the eyepiece lens 21 gets a short focal length. For the setting of FIG. 4(B), the axial separation between the lens 17 and the lens 18 is made narrow so that the focal length of the eyepiece lens 21 becomes long. In such a manner, the diopter is adjusted.

In the foregoing embodiments, the photographic lens is in the form of the zoom lens. The next embodiment will be described as using a conversion lens for the purpose of varying the focal length. The same reference numerals have been employed to denote the like parts having equivalent functions and any more detailed explanation of them is omitted here.

Figure 5A:
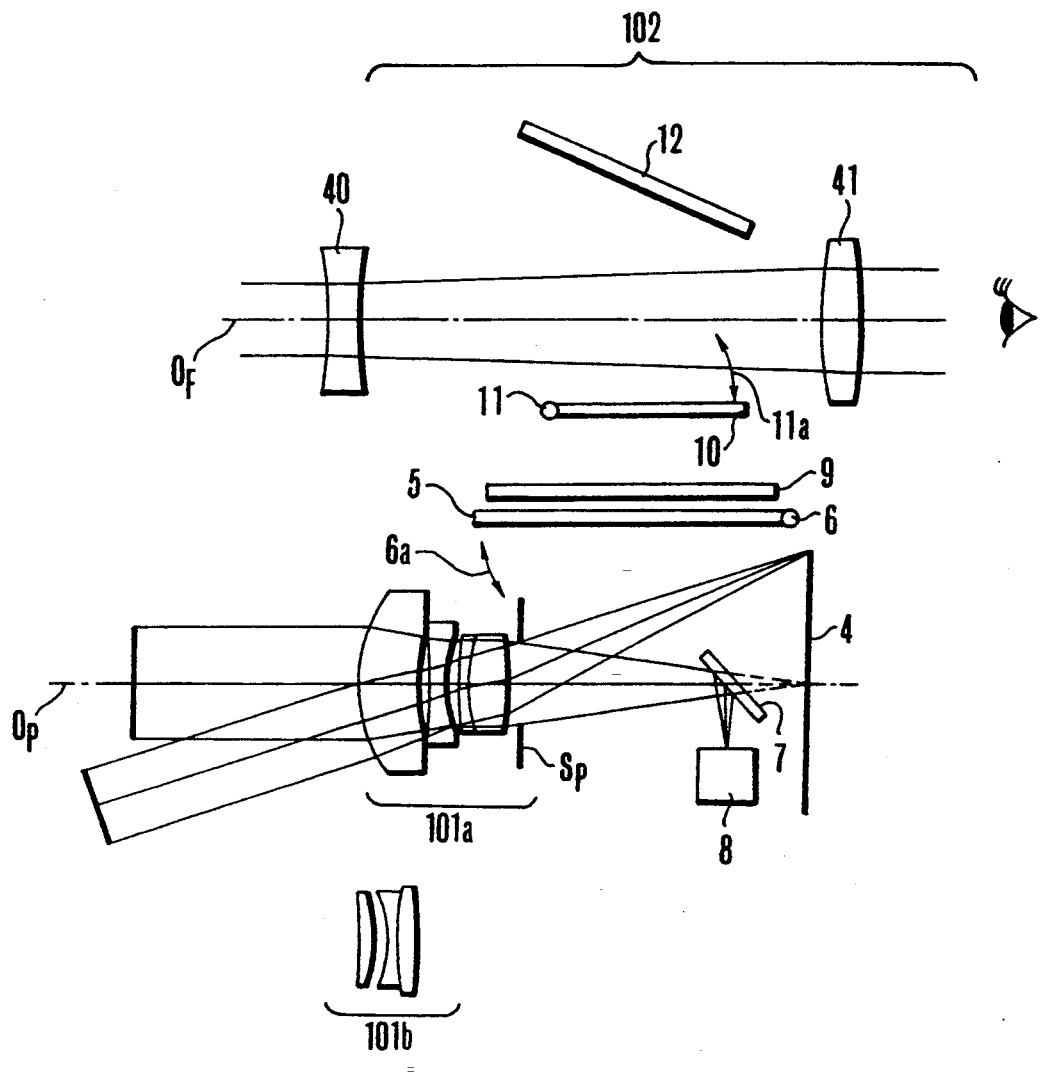
FIGS. 5(A) and 5(B) are diagrams illustrating the longitudinal section of lenses for another camera system concerning the invention with geometries of optical paths, particularly FIG. 5(A) being a geometry of the optical paths when the focal length is in the wide-angle end and FIG. 5(B) being a geometry of the optical paths when the focal length is in the telephoto end.
Figure 5B:
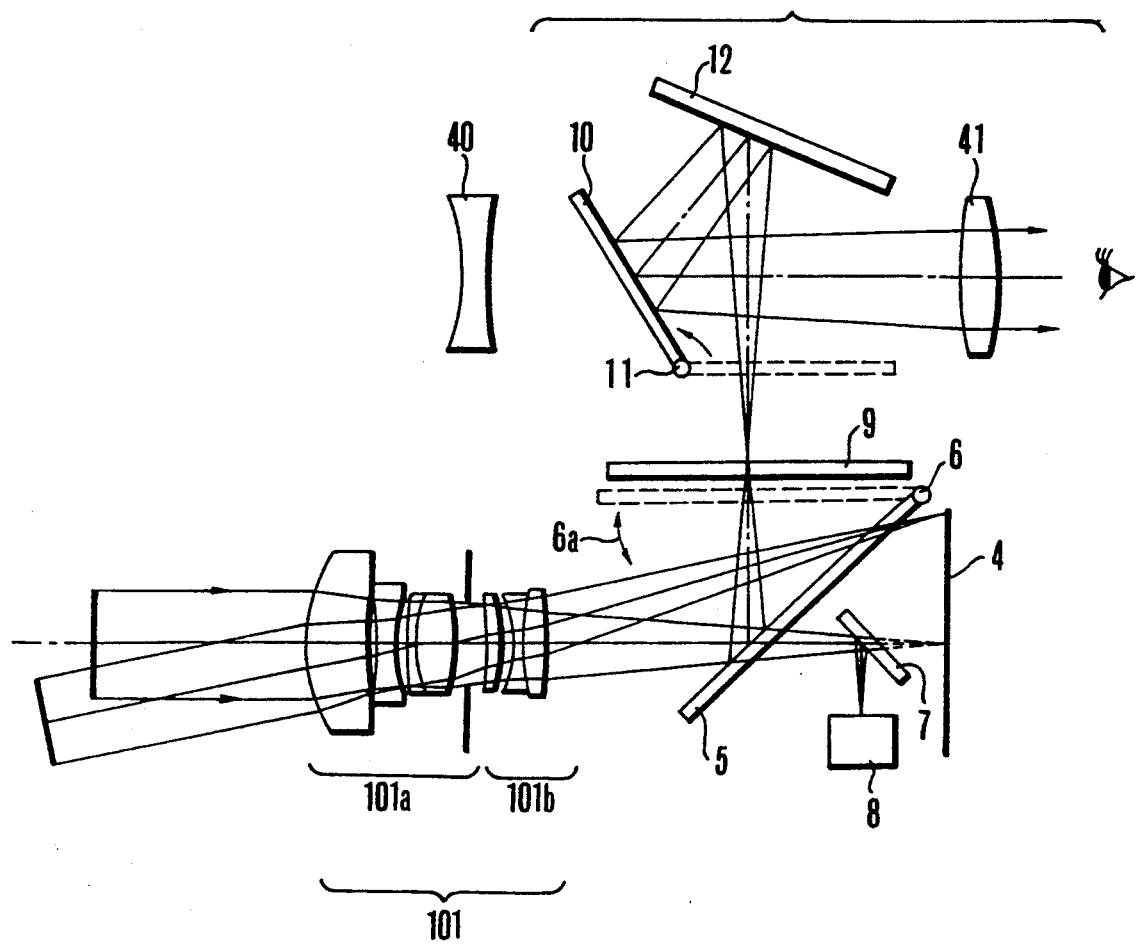

FIGS. 5(A) and 5(B) are schematic diagrams of the main parts of the optical system of another embodiment of the camera system according to the invention, FIG. 5(A) being in an operative position where the photographic lens has a short focal length, and FIG. 5(B) being in another operative position where the photographic lens has a long focal length.

In these figures, reference numeral 101 denotes the photographic lens receptive of light from an object (not shown) to be photographed for forming an object image on a photosensitive surface 4. A conversion lens 101b of negative power is arranged on forward movement of a master lens 101a to enter a space created behind it as shown in FIG. 5(B).

In the present embodiment, by using the conversion lens 101b put behind the master lens 101a, the focal length of the entire system is increased. Thus, a photographic lens of different focal lengths is formed.

A rotatable mirror 5 (M1) is arranged on selection of the TTL finder mode to turn about a pivot support point 6 in a direction of arrow 6a to enter the photographic optical path. Another rotatable mirror 10 (M2) is likewise arranged on selection of the TTL finder mode to turn about a pivot support point 11 in a direction of arrow 10a to enter the optical axis $O_F$. A fixed roof mirror 12 and an eyepiece lens 41 are included.

A first observing system 102 comprises, in FIG. 5(A), a negative objective lens 40 and the positive eyepiece lens 41, thus forming a reverse-Galilean finder arranged independently of the photographic system.

This first observing system forms an image of an object to be photographed that is observed by the eyepiece lens 41. Meanwhile, in FIG. 5(B), for observing the object image, instead of the objective lens 40, the focusing screen 9 is used in cooperation with the roof mirror 12 and the mirror 10 so that the object image on the screen 9 can be observed through the eyepiece lens 41. Thus, a TTL type observing system is formed.

In the present embodiment, when the camera system is switched to the short focal length mode where the master lens 101a is used as the photographic lens as shown in FIG. 5(A), the conversion lens 101b is taken out of axial alignment with the master lens 101a as is seen in FIG. 5(A). The mirrors 5 and 10 too are retracted from the respective optical paths as shown in FIG. 5(A).

In other words, the mode of FIG. 5(A) operates with the master lens 101a only focusing the light beam entering therethrough to form an object image on the photosensitive surface 4. At this time, the photographic lens has a focal length of 36 mm and can take a back focal distance of 26.5 mm, as the back focal distance is cleared of the mirror 5.

This mode operates also with the first observing system using the objective lens 40 and the eyepiece lens 41 to observe an object image in air.

In the present embodiment, since, as the photographic lens has the short focal length, the finder parallax error is small, the camera system is formed into the twin-lens type with the photographing system and the observing system arranged independently of each other in order to permit the back focal distance of the photographic system to becomes as short as possible. Thus, the primary requirement of minimizing the size of the whole lens system is fulfilled.

To switch the camera system to the other mode for the long focal length of the photographic lens, the master lens 101a is first moved forward from the position of FIG. 5(A) to thereby create a space, and the conversion lens 101b is then inserted into that space as shown in FIG. 5(A). This results in changing the focal length of the entire system to the longer side. The thus set value of the focal length is 59.6 mm and the back focal distance takes 36.1 mm.

And, the rotatable mirrors 5 and 10 are put into the respective optical paths in response to insertion of the conversion lens 101b as shown in FIG. 5(B). Since, at this time, the back focal distance is so long as 36.1 mm, the mirror 5 can be put into the operative position, leaving a sufficient clearance in the back space.

An optical path to and through the TTL finder observing system is also shown in FIG. 5(B). The light beam entering through the photographic lens 101 is reflected by the mirror 5 to the focusing screen 9 on which an object image is formed. Light radiating from the object image is reflected from the roof mirror 12 and the mirror 10 in sequence to the eyepiece lens 41 so that it can be observed as an erected non-reverse image.

Incidentally, the mirror 10 in this position also serves to block the light entering from the objective lens 40 of the observing system.

And, when exposing the photosensitive surface 4, the back space of the photographic lens 101 is first cleared of the mirror 5 and the mirror 7 and a shutter (not shown) is then opened and closed.

In the present embodiment, when the photographic system has the long focal length, the camera system takes the TTL single-lens reflex form so that no finder parallax occurs.

Thus, even in the present embodiment, the camera system is made virtually equivalent to the TTL single-lens reflex camera, while nevertheless permitting reduction of the size of the whole camera to the same order as the size of bifocal length changeable compact camera to be achieved.

Next, a numerical example of the master lens 101$a$ and the conversion lens 101$b$ of the present embodiment is shown in the following tables where Ri is the radius of curvature of the i-th lens surface, counting from front, Di is the i-th axial lens thickness or air separation, counting from front, and Ni and $vi$ are the refractive index and Abbe number of the glass of the i-th lens element, counting from front, respectively.

In the numerical example, the lens elements with R1 through R8 constitute the master lens 101$a$, and the lens elements with R9 through R14 constitute the conversion lens 101$b$. F stands for the focal length and "b.f." for the back focal distance.

Figure 7A:
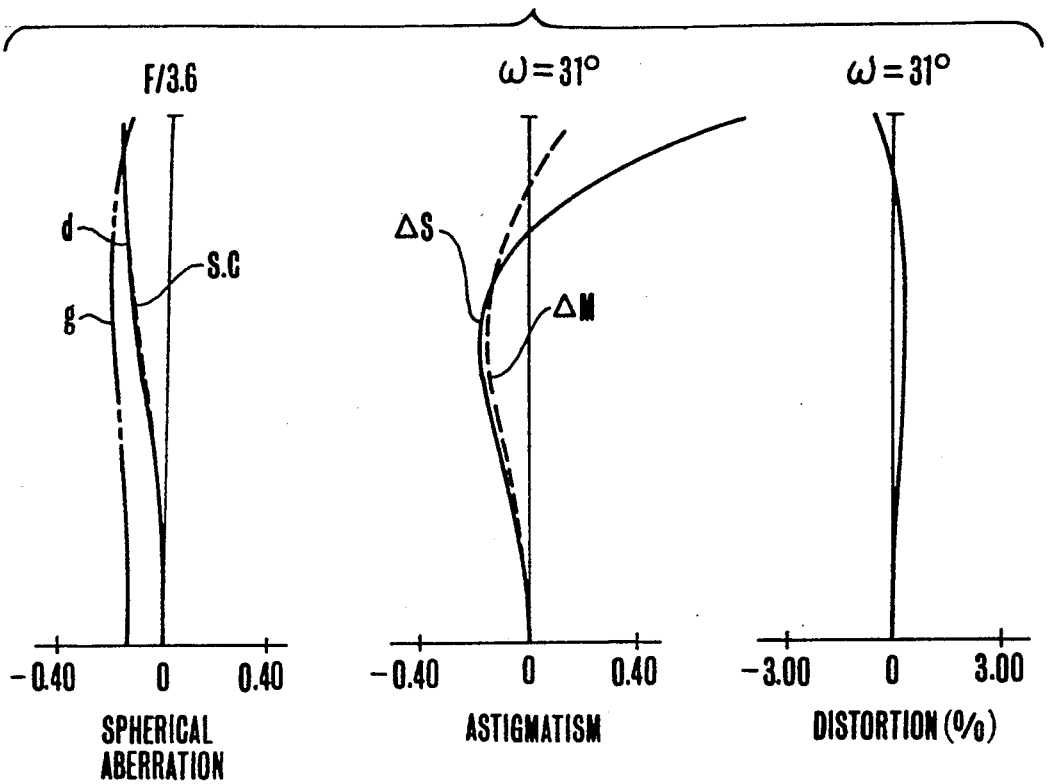
FIGS. 7(A) and 7(B) are graphic representations of the various aberrations of the lens data shown in FIGS. 5(A) and 5(B), FIG. 7(A) showing the various aberrations in the wide-angle end and FIG. 7(B) showing the various aberrations in the telephoto end, where g and d stand for the spectral g-line and d-line respectively, and ΔM and ΔS represent the meridional image surface and the sagittal image surface respectively.
Figure 7B:
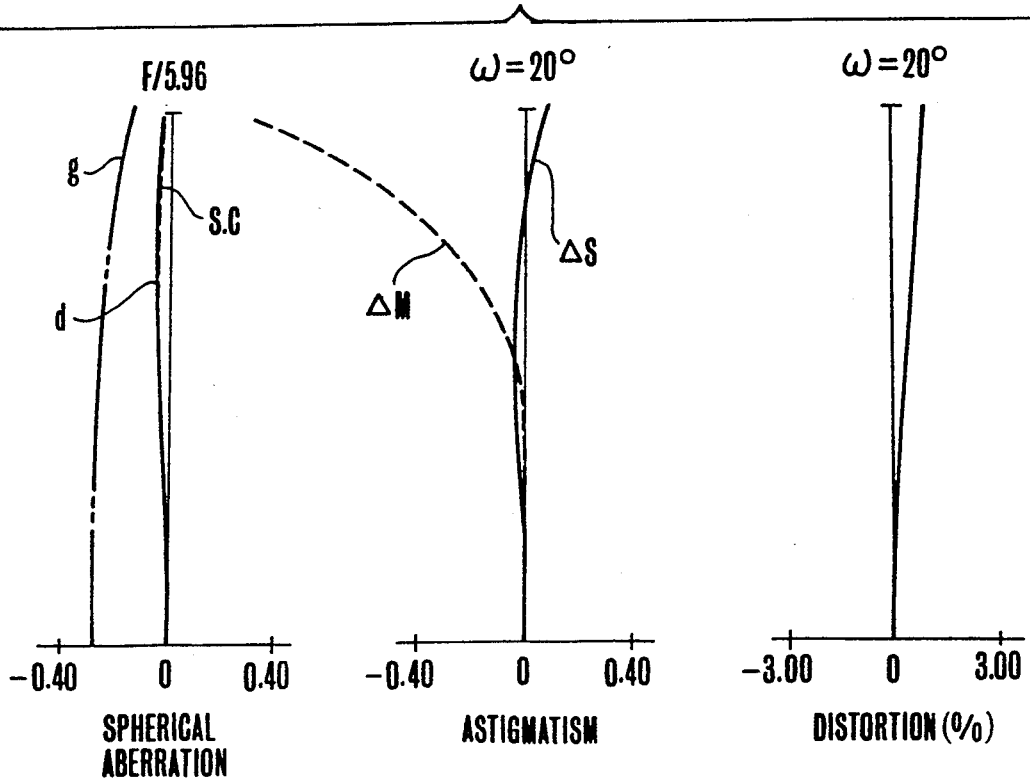

Incidentally, FIGS. 7(A) and 7(B) show the various aberrations of the lens data shown in FIGS. 5(A) and 5(B) in the wide-angle end and telephoto end, respectively.

| Numerical Example |||| 
|---|---|---|---|
| F = 36, 59.6 FNo = 1:3.6, 5.96 2$\omega$ = 62°, 39.9° ||||
| R1 = 13.11 | D1 = 5.61 | N1 = 1.77250 | $v1$ = 49.6 |
| R2 = 34.56 | D2 = 0.85 | | |
| R3 = −46.22 | D3 = 1.68 | N2 = 1.72151 | $v2$ = 29.2 |
| R4 = 11.68 | D4 = 1.13 | | |
| R5 = 58.69 | D5 = 0.68 | N3 = 1.58144 | $v3$ = 40.7 |
| R6 = 11.90 | D6 = 3.67 | N4 = 1.80610 | $v4$ = 40.9 |
| R7 = −26.53 | D7 = 1.04 | | |
| R8 = Stop | D8 = 1.5 | | |
| R9 = −71.67 | D9 = 1.64 | N5 = 1.68893 | $v5$ = 31.1 |
| R10 = −13.02 | D10 = 0.95 | | |
| R11 = −11.68 | D11 = 0.70 | N6 = 1.88300 | $v6$ = 40.8 |
| R12 = 35.73 | D12 = 0.09 | | |
| R13 = 22.85 | D13 = 2.12 | N7 = 1.53256 | $v7$ = 45.9 |
| R14 = −41.41 | | | |

| | Photographic Lens ||
|---|---|---|
| Parameter | Mater Lens | Master lens plus Conversion Lens |
| Focal Length F | 36 | 59.6 |
| b.f. | 26.5 | 36.1 |

Figure 6A:
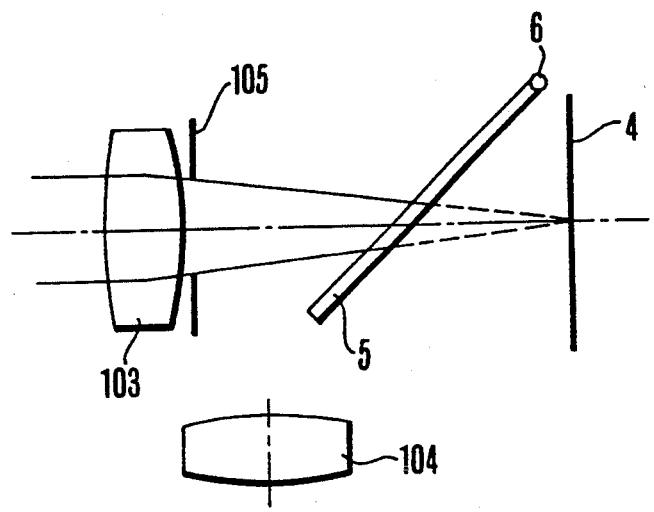
FIGS. 6(A) and 6(B) are diagrams of another practical example.
Figure 6B:
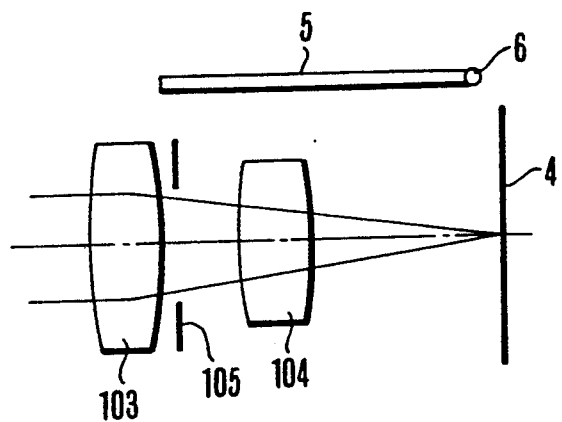

FIGS. 6(A) and 6(B) are schematic diagrams of the main parts of an optical system constituting only part of the photographing system of another embodiment of the camera system according to the invention. FIG. 6(A) shows an operative position of the photographing system where the photographic lens has a long focal length, and FIG. 6(B) shows another operative position of the photographing system where the photographic lens has a short focal length.

In the present embodiment, a conversion lens is used with reverse selection of the observing system to that in the embodiment shown in FIGS. 5(A) and 5(B).

In FIG. 6(A), a photographic lens 103 is followed rearwardly by an aperture stop 105. A rotatable mirror 5 is supported on a pivot support shaft 6. A conversion lens 104 has a positive refractive power and, in the case of the photographic lens of long focal length shown in FIG. 6(A), is retracted from the photographic optical path.

For a short focal length, as shown in FIG. 6(B), the mirror 5 is retracted from the photographic optical path and the conversion lens 104 is inserted into the back space of the photographic lens 103 to form a photographic system. Thus, the focal length of the entire system is changed to the shorter one.

The camera system in the mode of FIG. 6(A) operates with the choice of a TTL finder including the mirror 5 by which the light beam from the photographic lens 103 is reflected to a focusing screen (not shown). And, when the camera system is switched to the mode of FIG. 6(B), an external type finder, though not shown, is used instead of the TTL finder, being arranged independently of the photographing system. The other features are similar to those of the embodiment shown in FIG. 5(A) and 5(B).

It is to be noted that in the present embodiment, the conversion lens 104 may otherwise be made to have a negative refractive power. For this case, the use of the conversion lens behind the photographic lens increases the focal length of the entire system.

It is also to be noted that in each of the foregoing embodiments, the conversion lens may otherwise be arranged in front of the photographic lens. Even in this case, a camera system according to the present invention can be achieved likewise.

The objective lens in the first finder may be of the type having only one image plane. To afford an erected non-reverse, or correct image under this condition, a novel mirror arrangement must be considered. In this regard, an embodiment is described below by reference to FIGS. 8(A) and 8(B).

Figure 8A:
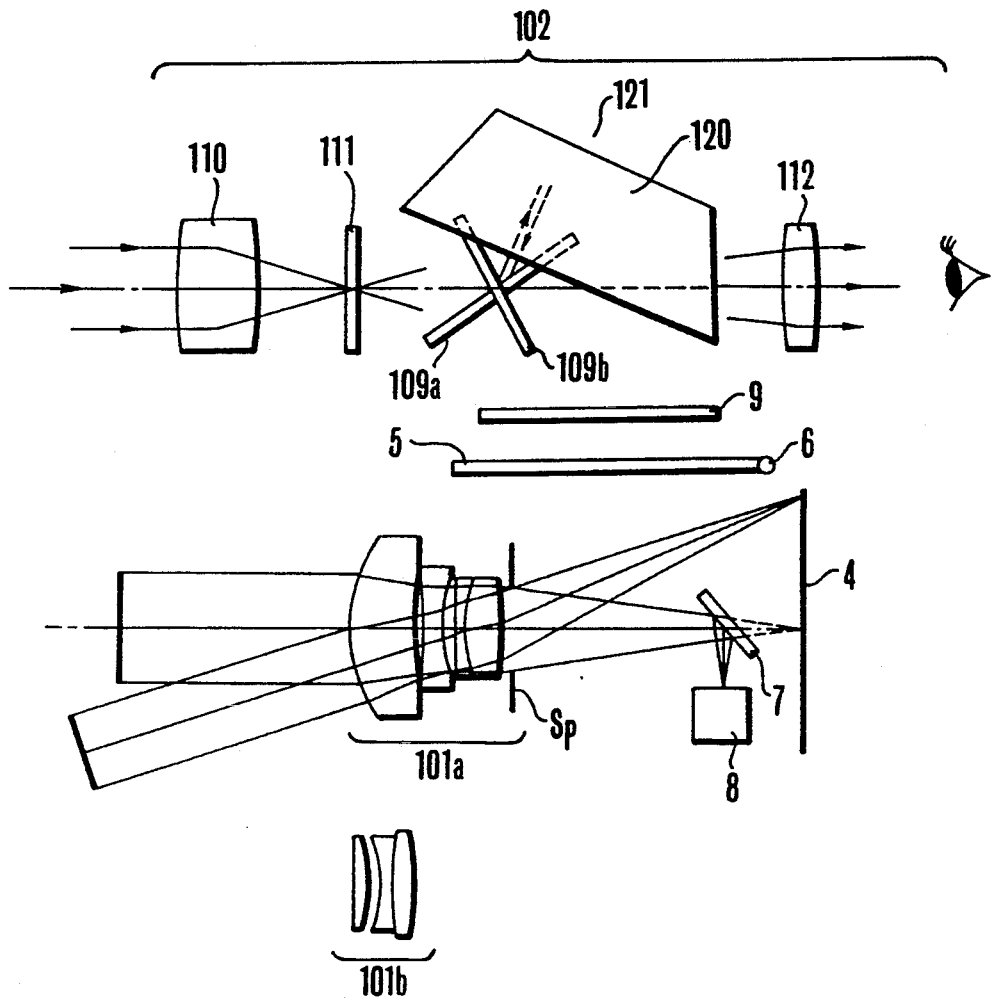
FIGS. 8(A) and 8(B) are diagrams illustrating the longitudinal section of lenses for another camera system concerning the invention with geometries of optical paths, particularly FIG. 8(A) being a geometry of the optical paths when the focal length is in the wide-angle end and FIG. 8(B) being a geometry of the optical paths when the focal length is in the telephoto end.

A first observing system 102 comprises, in FIG. 8(A), an objective lens 110 having a positive refractive power, mirrors 109$a$ and 109$b$, a roof mirror 120 and an eyepiece lens 112, thus forming a finder system of the real image type, and is arranged independently of the photographic lens 101.

Figure 9:
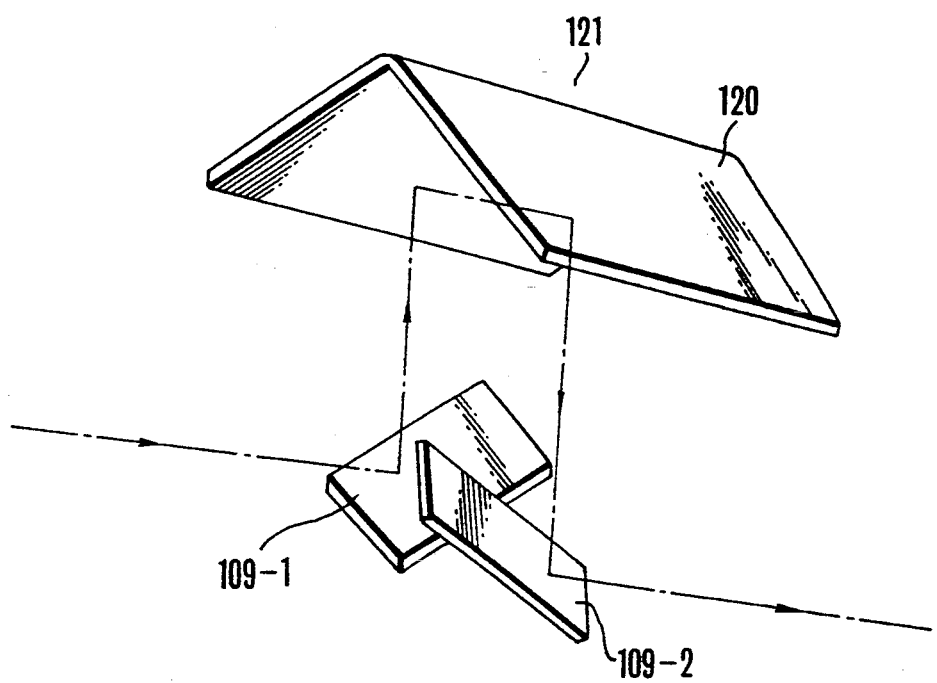
FIG. 9 is a perspective view of a mirror arrangement for the external finder.

With this first observing system 102, an object image formed on a primary image plane 111 by the objective lens 110 is laterally reversed by a porro-mirror 121 that makes an optical path shown in FIG. 9, so that a correct image can be observed through the eyepiece lens 112.

Figure 8B:
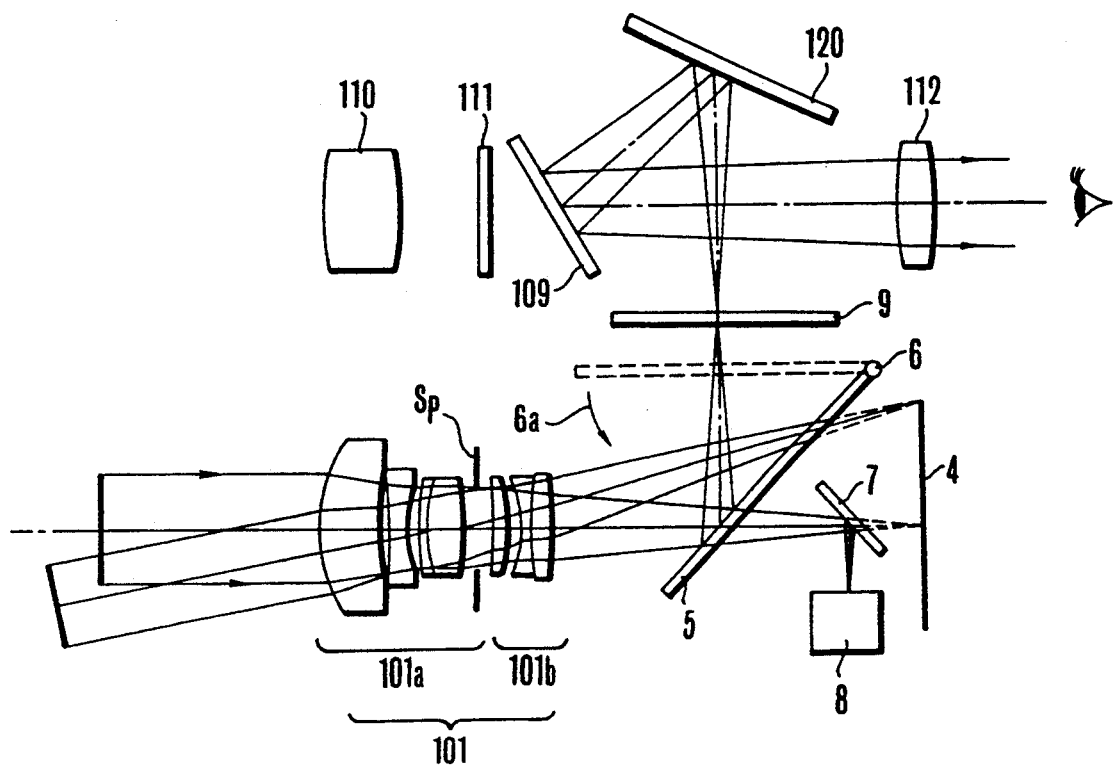

In another mode of FIG. 8(B), to observe an object image, the photographic lens 101 is used instead of the objective lens 110. Light from the object image on the focusing screen 9 is turned by a so-called "hollow pentagonal" system comprised of the roof mirror 120 and the mirror 109 so that it is observed as a correct image by the eyepiece lens 112. Thus, a TTL observing system is formed.

During the switching operations between these two modes, the mirrors 109$a$ and 109$b$ rotate. When they constitute the porro-mirror together with the roof mirror, the first finder is established. When they constitute part of the hollow pentagonal system, the TTL finder is established.

Figure 10A:
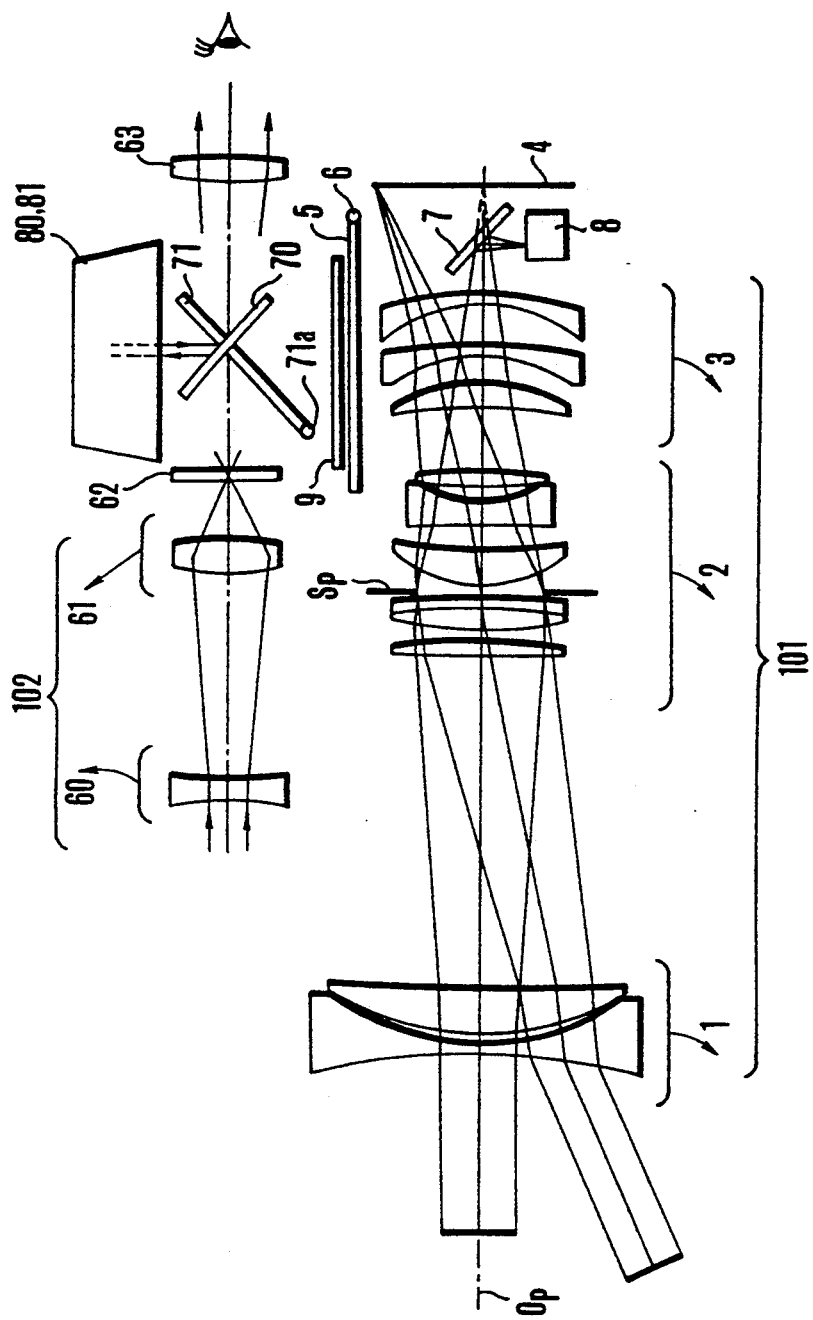
FIGS. 10(A) and 10(B) are diagrams illustrating the longitudinal section of lenses for another camera system concerning the invention with geometries of optical paths, particularly FIG. 10(A) being a geometry of the optical paths when the focal length is in the wide-angle end and FIG. 10(B) being a geometry of the optical path when the focal length is in the telephoto end.
Figure 10B:
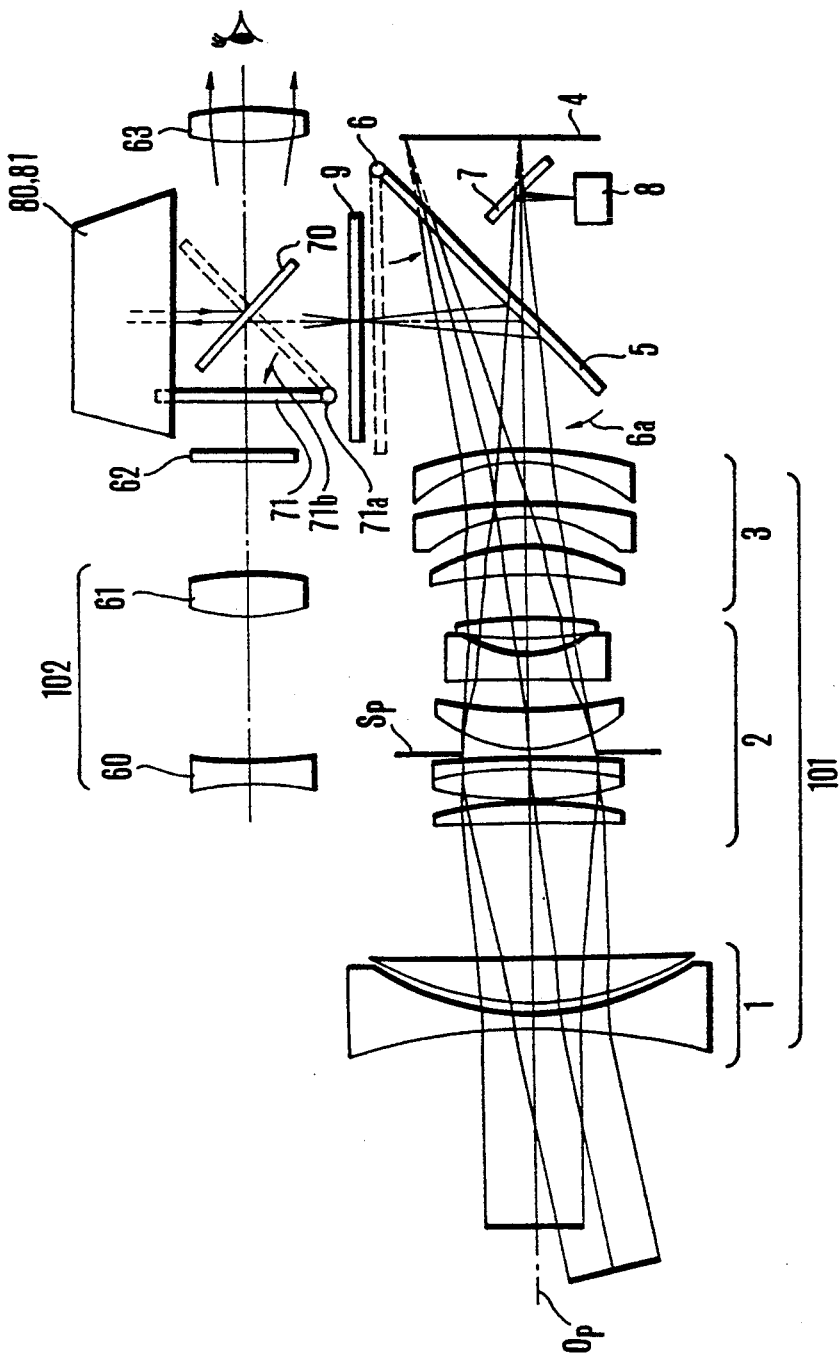

Referring next to FIGS. 10(A) and 10(B), another embodiment is described where the first finder system that has the finder optical axis $O_F$ is made capable of zooming, and the photographic lens 101 too is made capable of zooming. For this case, the photographic lens 101 is exactly the same as the zoom lens shown in FIG. 3(A) and 3(B). Incidentally, the member of the same reference numeral fulfills the same function.

Lens units 60 and 61 having negative and positive refractive powers respectively are moved in respective loci indicated by arrows when zooming is performed from the wide-angle end to the telephoto end. Reference numeral 62 denotes an image plane.

Three mirrors 80 (M2), 81 (M3) and 70 (M4) are positioned as shown in FIG. 11. In the TTL finder mode of FIG. 10(B), these mirrors cooperate with the mirror 5, constituting, as a whole, a porro-mirror system for an erected non-reverse image. It is to be noted that these three mirrors 80, 81 and 70 may be constructed in unified form, in other words, replaced by a prism shown in FIG. 13.

Also, when making an exposure, as shown in FIG. 10(A), the light having passed through the photographic lens 101 is collected to form an object image on the photosensitive surface 4. For this mode, the photographic lens 101 varies its focal length within the aforesaid range of f=29.1–58.62 mm. Incidentally, at this time, the mirror is retracted from the photographic optical path.

Meanwhile, in a first observing system having the optical axis $O_F$, an objective lens 102 forms an object image on a primary image plane 62. Light from this image is reflected from a mirror 71 and the mirrors 80, 81 and 70 in this order as shown in FIG. 12 to the eyepiece lens 63. These four mirrors constitute a porro-mirror. A primary image type observing system is thus formed with which a good finder image can be observed.

Even in the present embodiment, for the short focal length range, or the region from the wide-angle end to the standard, of the photographic lens and a far distance region of the focusing range, where the amount of finder parallax error is small, the camera system is constructed to the twin-lens type with the photographing system and the observing system arranged independent of each other to permit the back focal distance of the photographic lens to be as far reduced as possible. Thus, priority of the requirement of reducing the size of the entire lens system is fulfilled.

Meanwhile, when the photographic lens 101 is switched to another region of the zooming range which is from the standard to the longest focal length, or and/or when it is used as a close-up photographic lens, all the lens groups of the photographic lens 101 are moved forward from the positions of FIG. 10(A) to thereby create a back space, and then the mirror 5 is set in that space as shown in FIG. 10(B). In this mode, the photographic lens 101 varies its focal length in a range of 58.62–131.79 mm. The back focal distance is 31.13 mm.

And, the rotatable mirror 5 is put into the optical path in response to change of the zooming range, or forward movement of the third lens group 3 as shown in FIG. 10(B). Another rotatable mirror 71 retracts from the optical path of the finder. For the mirror 5 to be set in this position, the back focal distance is increased to 31.13 mm. This back space is large enough to allow the mirror 5 to rotate to the set position behind the photographic lens 101.

It is to be noted that in this mode the mirror 71 fulfills the function of blocking the light entering from the objective lens 102 of the observing system as has been described before.

And, when exposing the photosensitive surface 4 to the object image of the photographic lens 101, the mirror 5 and the mirror 7 are moved out of the optical path, and the shutter means (not shown) is opened and closed.

In the present embodiment too, when the photographic lens takes a long focal length and/or when shooting an object at a short distance, the camera system is set to the TTL single-lens reflex form in order to insure that no finder parallax occurs even if one encounters a situation where a close object has to be shot with variation of the focal length.

In the foregoing embodiments, the use of the zoom lens or the bifocal length changeable lens as the photographic lens has provided the possibility of creating the space for accommodation of the reflex mirror. In the following, as the photographic lens is moved forward for focusing purposes, the resultant increase of the back space is utilized in forming a TTL finder. An embodiment employing this feature is next described by reference to FIGS. 14(A) and 14(B).

In the present embodiment, the camera system operates with selection of two regions of a focusing range. Diagrams of optical paths are shown in FIG. 14(A) for the far distance region from infinity to a certain distance, and in FIG. 14(B) for the near region (covering even macro photography) from the certain distance to a minimum.

Figure 14A:
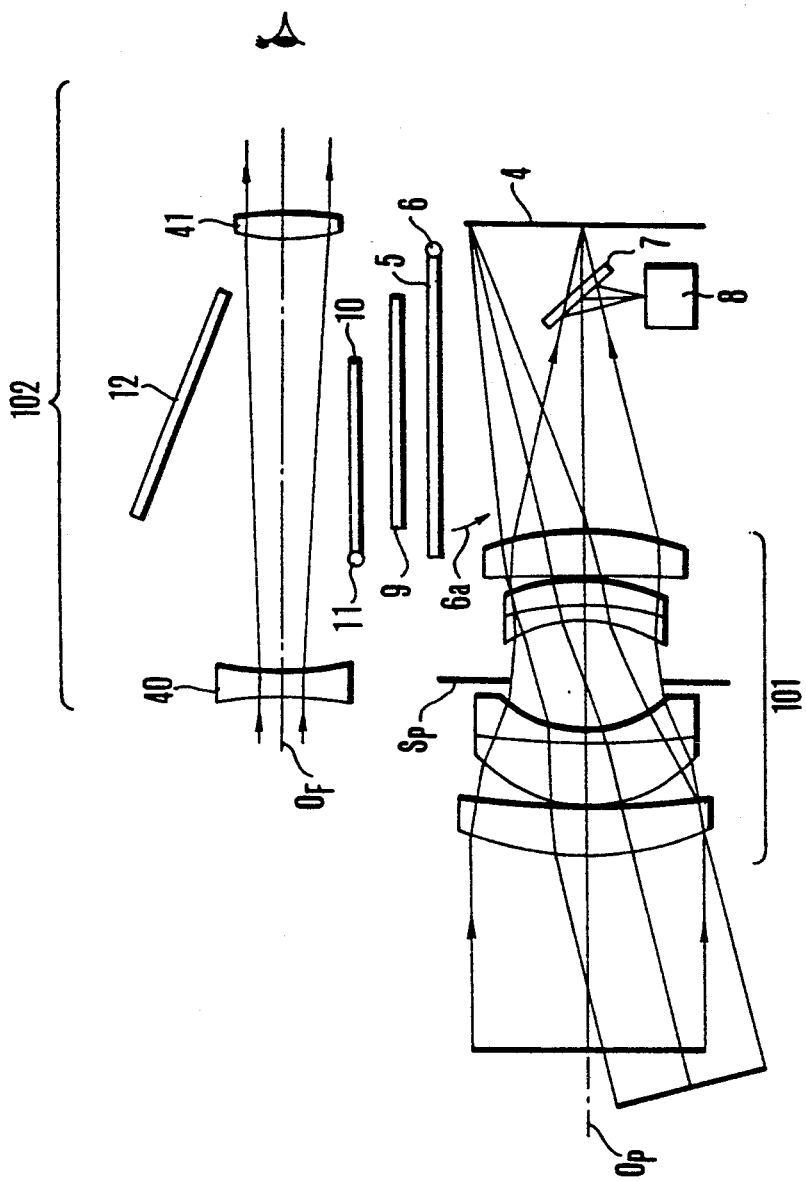
FIG. 14(A) is a diagram illustrating the optical paths through the photographic lens and the finder system when focusing on an object at a long distance.

In the present embodiment, for an object in the far distance region (from infinity to 500 mm), the photographic lens takes its place very near to the film 4, as shown in FIG. 14(A). Therefore, the optical paths must previously be cleared of the mirrors 5 and 10. Hence, the camera system in this mode is formed with the photographic lens 101 and a first observing system comprised of lens units 40 and 41 operating independently of each other as shown in the same figure.

In other words, in the mode of FIG. 14(A), the light beam having passed through the photographic lens 101 is used only in forming an object image on the photosensitive surface 4. At this time, the photographic lens 101 of 51 mm in focal length gives a back focal distance of 32.14 mm.

The first observing system has the objective lens 40 to form an image of an object to be photographed, which is observed through the eyepiece lens 41.

In the present embodiment, when shooting a far distant object, the amount of finder parallax error is small. Therefore, the camera system is formed into the twin-lens type with the photographing system and the observing system arranged independently of each other to permit the back focal length of the photographic lens to be as far reduced as possible. Thus, priority of the requirement of minimizing the size of the entire lens system is fulfilled.

Figure 14B:
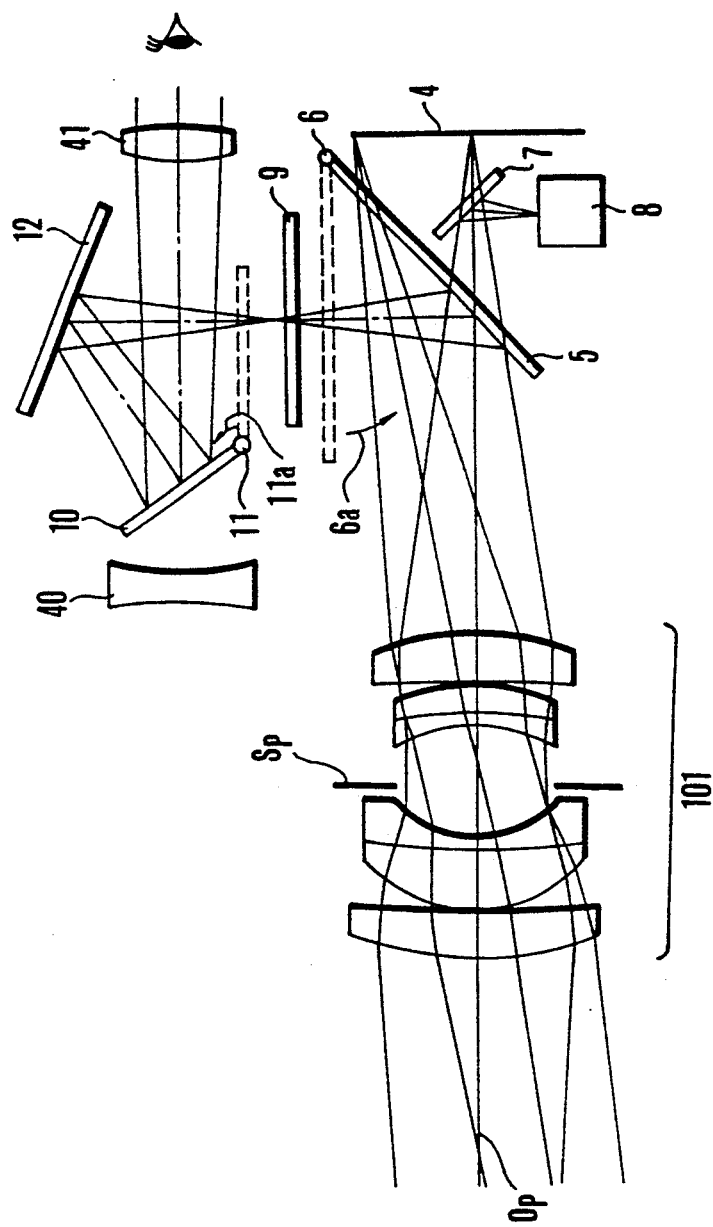
FIG. 14(B) is a diagram illustrating the optical paths through the photographic lens and the finder system when focusing on a close object.

Next, in the present embodiment, when shooting an object in the near distance range (500–250 mm including macro photography), the photographic lens 101 is axially moved from the position of FIG. 14(A) forward to effect focusing, while increasing the axial length of the back space. The mirror 5 is then turned to enter that back space as shown in FIG. 14(B). When the object distance is 500 mm, the photographic lens 101 gives a back focal distance of b.f.=36.15 mm. Incidentally, the position shown in the same figure occurs when the object distance is 250 mm. At this time, the back focal distance is 49.6 mm.

And, another rotatable mirror 10 is also turned to and set in the optical path as shown in FIG. 14(B). Since, at this time, the back focal distance is as long as 36.15 mm or more, the mirror 5 can be turned to the set position, leaving a sufficient clearance to the back of the photographic lens 101.

And, when making an exposure, the mirror 5 is moved out of the photographic optical path and then a shutter (not shown) is opened without suffering the parallax even for a close object.

A numerical example of the photographic lens of the present embodiment is shown in the following table, where Ri is the radius of curvature of the i-th lens surface, counting from front, Di is the i-th axial lens thickness or air separation, and Ni and vi are respectively the refractive index and Abbe number of the glass of the i-th lens element, counting from front.

Figure 16:
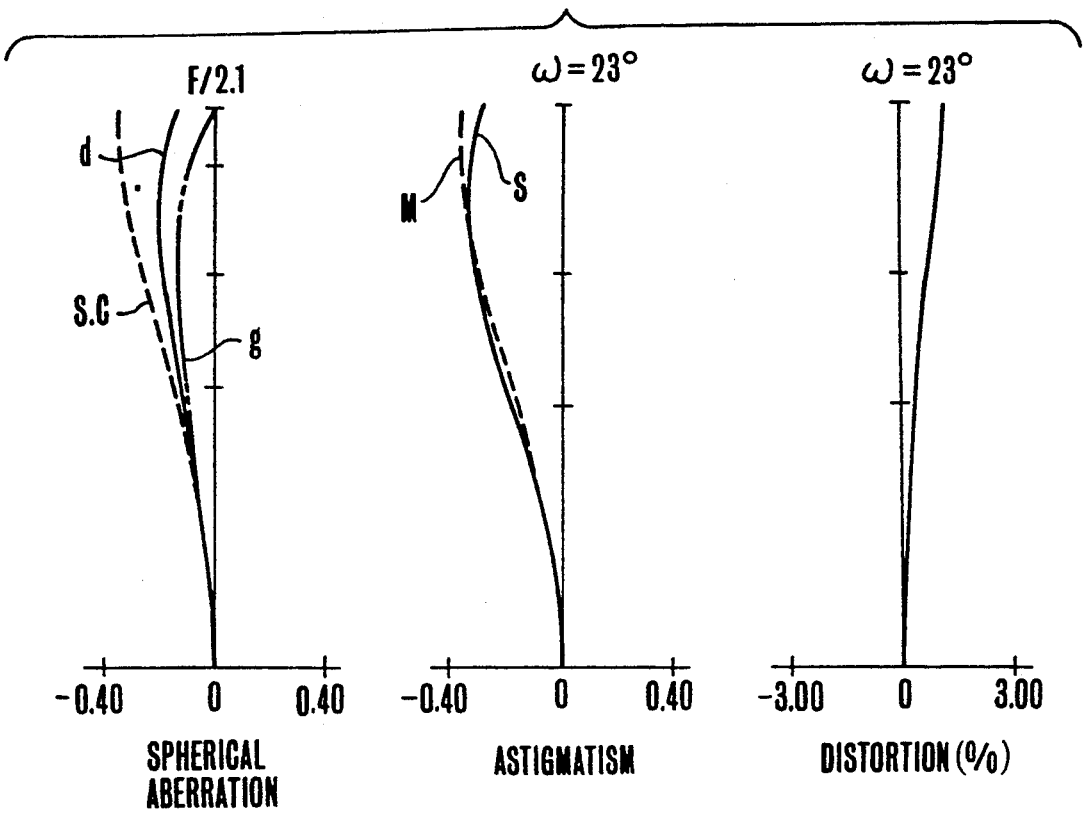
FIG. 16 is graphic representations of the various aberrations of the photographic lens shown in FIGS. 14(A) and 14(B).

Incidentally, FIG. 16 shows a graphic representation of the various aberration of the photographic lens shown in FIGS. 14(A) and 14(B).

Numerical Example:
F = 51  FNo = 1:2.1  2ω = 46°

| R1 = 34.68 | D1 = 4.62 | N1 = 1.80610 | v1 = 40.9 |
|---|---|---|---|
| R2 = 104.81 | D2 = 0.13 | | |
| R3 = 16.21 | D3 = 6.04 | N2 = 1.60311 | v2 = 60.7 |
| R4 = 67.09 | D4 = 1.34 | N3 = 1.69895 | v3 = 30.1 |
| R5 = 12.28 | D5 = 5.10 | | |
| R6 = Stop | D6 = 5.84 | | |
| R7 = −16.68 | D7 = 1.27 | N4 = 1.64769 | v4 = 33.8 |
| R8 = −38.33 | D8 = 2.86 | N5 = 1.77250 | v5 = 49.6 |
| R9 = −26.43 | D9 = 0.13 | | |
| R10 = −1420.94 | D10 = 4.80 | N6 = 1.77250 | v6 = 49.6 |
| R11 = −31.03 | | | |

| Object Distance | Magnification | Back Focal Distance |
|---|---|---|
| ∞ | 0 | 32.14 |
| 50 cm | −0.129 | 36.65 |
| 25 cm | −0.383 | 49.6 |

The photographic lens 101 of the present embodiment is constructed with 4 groups of 6 members, formed to the Gauss type, and arranged to be above to focus from an infinitely distant object to a macro region.

Figure 15A:
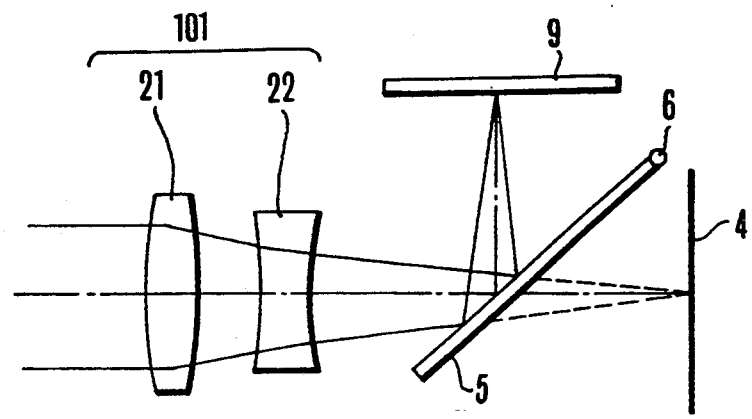
FIGS. 15(A) and 15(B) are longitudinal section views of another practical example concerning FIGS. 14(A) and 14(B).
Figure 15B:
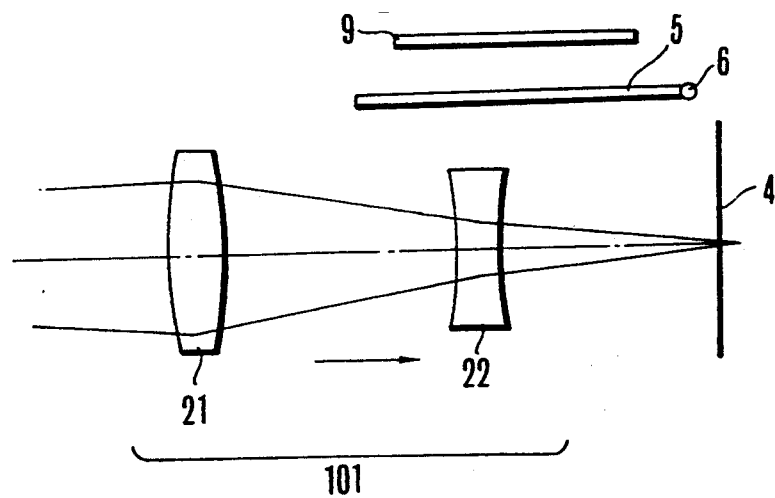

FIGS. 15(A) and 15(B) are schematic diagrams of the main parts of an optical system in the photographing system and its neighbor parts of another embodiment of the camera system according to the invention.

In the present embodiment, the photographic lens 101 is constructed from a lens group 21 of positive refractive power and another lens group 22 of negative refractive power, totaling two lens groups, of which the lens group 22 is axially moved to effect focusing. That is, it employs the rear focus type.

FIG. 15(A) shows an operative position for shooting an object at a middle or far distance, and FIG. 15(B) shows another operative position for close-up photography (including macro photography).

In the present embodiment, of the lens groups of the photographic lens, the last one or lens group 22 is used for focusing purposes to take an advantage that for the far distance region of the focusing range, the space between the lens group 22 and the image plane is so widened as to permit formation of a TTL type observing system as shown in FIG. 15(A). For the near distance region, as that space narrows, a twin-lens type camera system with an external observing system is formed as shown in FIG. 15(B).

Now, in the foregoing embodiments, the external or first finder system has been made to be of the optical type. In the following, the peculiar feature of the photographic lens is used in combination with an image pickup element such as a CCD arranged in a real image plane of the first finder system, thereby forming a camera system which not only has an electronic view finder but also is capable of video photography. In this regard, the first of embodiments is described by reference to FIGS. 17(A) and 17(B).

The photographing system used herein is nearly the same as that of FIGS. 1(A), 1(B), FIGS. 3(A), 3(B), or FIGS. 10(A), 10(B). The numerical data of a specific photographic lens 101 will be described later.

A first varifocal optical system 200 has an optical axis $O_F$ positioned in separation from the photographic optical axis $O_P$, and is constructed from lens units 201, 202, 203, 204 and 205. Zooming is performed by moving the lens units 203 and 204 along the optical axis $O_F$. An image pickup element or CCD 206 converts an optical image formed by the varifocal optical system 200 into an electrical signal and sends out this electrical signal to a display (not shown) of the electronic viewfinder and also to an electrical recording medium (not shown). Reference numeral 300 denotes a condenser lens. Reference numerals 301 and 303 denote mirrors for conducting a light beam of the photographic lens 101 to the first varifocal optical system as shown in FIG. 17(B). A lens unit 302 in a mode of FIG. 17(B) cooperates with the lens unit 205 to place the image formed by the photographic lens 101 onto the image pickup element 206.

Figure 17A:
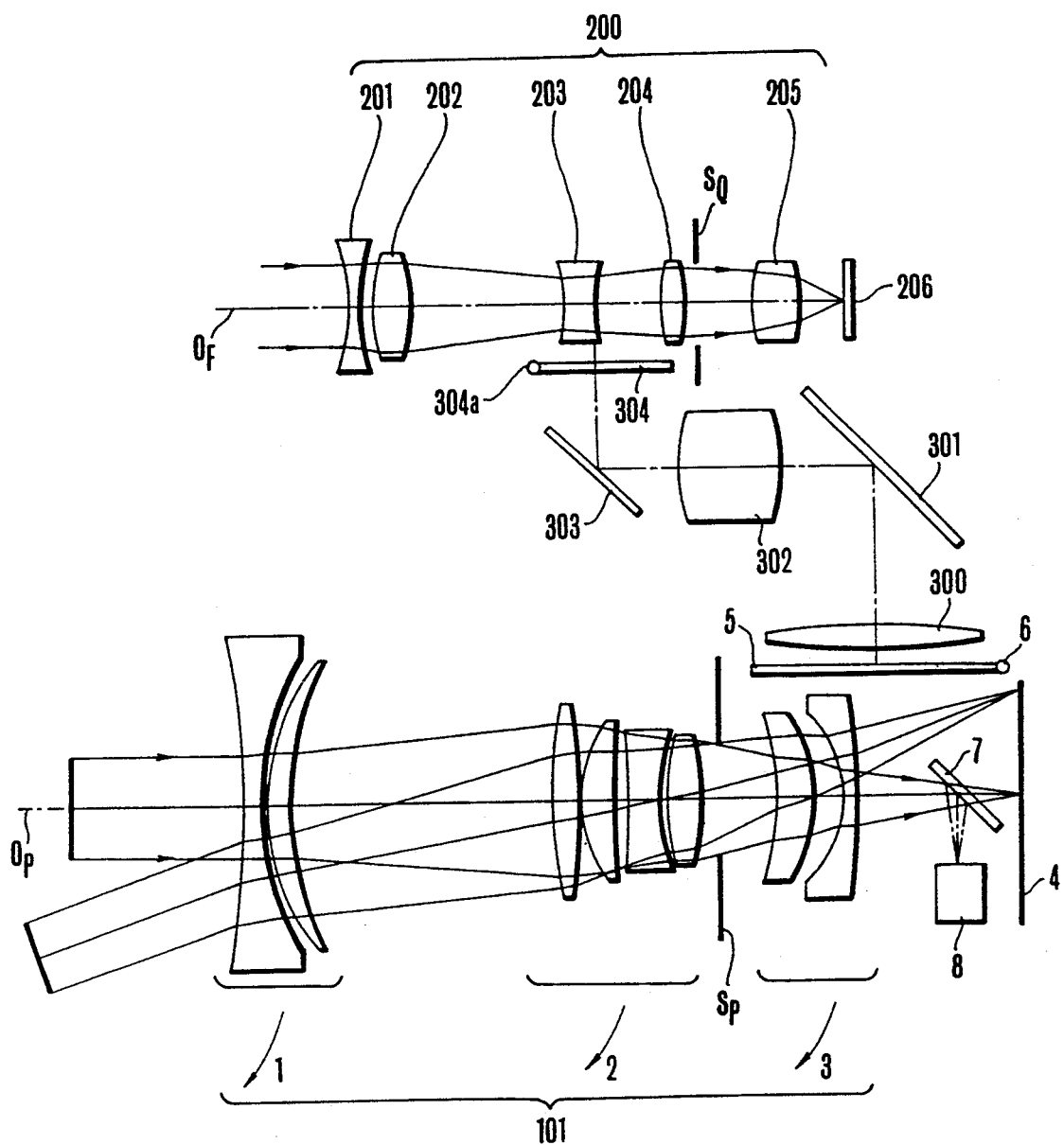
FIGS. 17(A) and 17(B) are diagrams illustrating the longitudinal section of lenses for another camera system concerning the invention with geometries of optical paths, particularly FIG. 17(A) being a geometry of the optical paths when the focal length is in the wide-angle end and FIG. 17(B) being a geometry of the optical paths when the focal length is in the telephoto end.
Figure 17B:
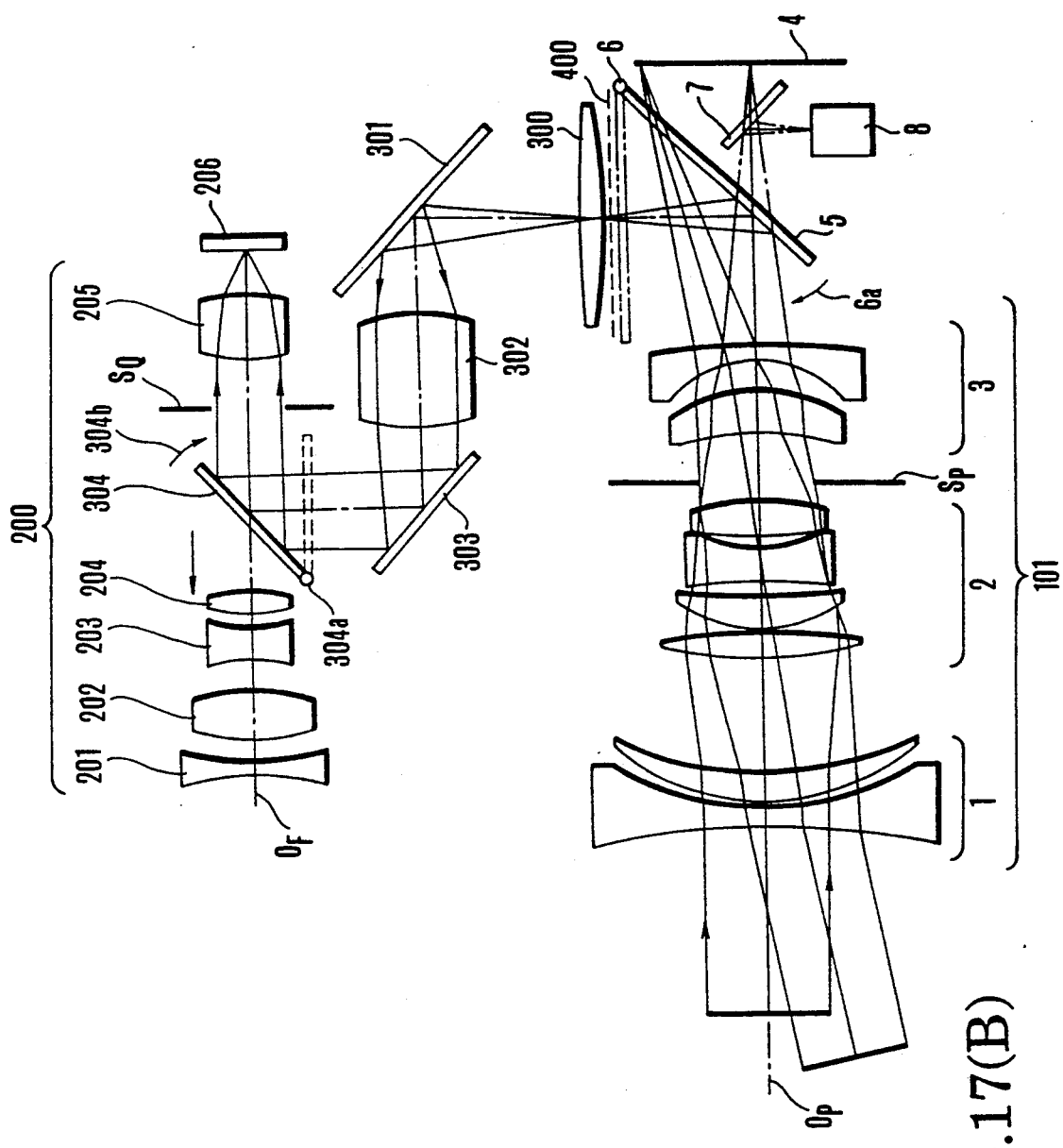

And, in another mode of FIG. 17(A), the light beam entering through the photographic lens 101 is used only in exposing the photosensitive surface 4 to an object image. For this mode, the photographic lens 101 in a numerical example to be described later varies its focal length within a first range of f=35.78–55 mm. Incidentally, in this mode, the mirror 5 is retracted from the photographic optical path. In this mode, the image formed by the photographic lens 200 arrives at the image pickup element 206. It is to be noted that the focal length f of the photographic lens 200 for the CCD of 8 mm in effective diameter lies in a range of f=6.61–10.17 mm. And, the image information is converted into electrical signals which are then processed to invert the image vertically, horizontally, before they are used in, for example, a display of the electronic viewfinder.

As is understood from the above description, the camera system is constructed in such a way that, when the photographic lens 101 is on the short focal length side, or in the first zooming range from the wide-angle end to the standard, the object images on the first image plane or film plane and the second image plane or image receiving surface of the CCD are formed by the respective different lenses from each other.

Next, in the present embodiment, in order to switch the photographic lens 101 to the long focal length side or to a second zooming range from the standard to the telephoto end and to form a TTL finder system, all the lens groups of the photographic lens 101 are moved forward from the positions of FIG. 17(A) to thereby create a space in the place particularly the third lens group 3 has occupied before, and the mirror 5 is put into that space as shown in FIG. 17(B) in response to movement of the lens 101.

Further, the zoom lens units 203 and 204 of the photographic lens 200 are moved forward in response to zooming movement of the photographic lens 101 from the wide-angle end to the intermediate focal length position, thereby creating a space between the zoom section and an aperture stop SQ, and the mirror 304 which is to cooperate with the mirror 5 is put into that space.

It is to be noted that for this mode, the photographic lens 101 in the numerical example to be described later is usable in the second zooming range of f=55-107 mm. And, the mirror 5 and the mirror 304 are simultaneously turned to the positions shown by the solid lines.

And, as shown in FIG. 17(B), the light entering through the photographic lens 101 is reflected by the mirror 5 to form an object image on a primary image plane 400. As the field lens 300, the reflection mirrors 301, 303 and 304 and the lenses 302 and 205 form a secondary image plane, light from the object image on the primary image plane 400 is guided to the image pickup element 206. And, the image pickup element 206 gets an electrical picture and sends its output to a display device (not shown) of the electronic viewfinder. At this time, the photographing system (201-204) is not in use. Incidentally, at this time the mirror 304 performs another function of blocking the light entering through the photographing system (201-204).

And, when exposing the film, the mirror 5 is removed from the position to clear the passage of the light from the photographic lens 101 to the photosensitive surface 4, and the shutter (not shown) is opened and closed.

As has been described above, the camera system is so constructed that, when the photographic lens 101 is in the second zooming range of long focal lengths, either one of the film plane and the CCD plane is arbitrarily chosen to receive the object image it forms.

Also, in the present embodiment, the magnification relationship of the images at the primary image plane 400 and the secondary image plane 206 is adjusted by the suitable design of the secondary image forming system so as to obtain the satisfactory image angle for the primary image plane. Thus, a good image angle relationship between the film and the finder is established.

It is to be noted that in the present embodiment, the mirror 5 may be made half-mirrored to permit a portion of the axial beam to go to the auto-focus unit 8.

Figure 18:
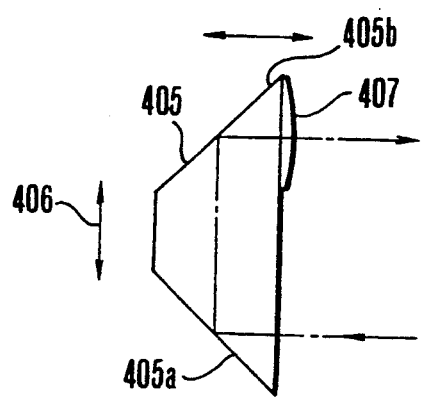
FIG. 18 is an elevation view of a prism usable in replacement of the mirrors 303 and 304 shown in FIGS. 17(A) and 17(B).

Also, in the present embodiment, the mirror 303 and the mirror 304 may be replaced by a prism block 405 whose inclined faces 405a and 405b are made totally reflective as shown in FIG. 18. When the camera system is switched between the first zooming range and the second zooming range, the prism block 405 is slidden in directions indicated by a double-headed arrow 406, thus entering into, and exiting from, the optical path. If such a prism block 405 is used, the assembling and adjusting operations become easy. Also, if the exit face of the prism block 405 is made to be a refracting surface 407, the adjusting operation becomes more easy.

It will be appreciated that in the present embodiment, despite the construction of the photographic lens 101 in the form of the high range zoom lens, because there is the peculiar feature that the very short back focal distance suffices for the first zooming range, a great advantage is produced that the size of the entire lens system can be easily reduced to a minimum.

Also, the photographic lens 200 does not have to have as high a zoom ratio as the photographic lens 101 has, but it is only required that its zoom ratio is almost equal to that zoom ratio of the photographic lens 101 which is used when the mode of FIG. 17(A) operates with the mirror 5 retracted out of the optical path, or the first zooming range is effective.

For example, if, as the entire zooming range of the photographic lens 101 is 4–5 the first zooming range is 2, the zooming range for the photographic lens 200 may be taken at 2 or thereabout. From this reason, the photographic lens 200 can be constructed to a very small size.

Besides this, the lens unit 302 too may be of the zoom type. If so, the object image on the image plane 400 can be re-formed on the image pickup plane 206 at an arbitrary magnification.

A numerical example of the photographic lens 101 of the present embodiment is shown in the following tables where Ri is the radius of curvature of the i-th lens surface, counting from front, Di is the i-th axial lens thickness or air separation, counting from front, and Ni and $\nu i$ are respectively the refractive index and Abbe number of the glass of the i-th lens element, counting from front. "b.f." stands for the back focal distance.

The shape of an aspheric surface is expressed in the coordinates with an X axis in the optical axis and an H axis in the direction perpendicular to the optical axis, the direction in which light advances being taken as positive, by the following equation:

$$X = \frac{(1/R)H^2}{1 + \sqrt{1 - (H/R)^2}} + AH^2 + BH^4 + CH^6 + DH^8 +$$

$$EH^{10} + \ldots + A'H + B'H^3 + C'H^5 + D'H^7 + E'H^9 + \ldots$$

where R is the radius of the osculating sphere and A, B, C, D and E are the aspheric coefficients.

Also, the notation, for example, "D−x" means "$10^{-x}$".

| Numerical Example: F = 35.78–107 FNo = 1:2.8–6.5 $2\omega$ = 62.3°-22.86° | | | |
|---|---|---|---|
| R1 = −105.50 | D1 = 1.97 | N1 = 1.72000 | $\nu1$ = 50.2 |
| R2 = 32.25 | D2 = 0.56 | | |
| R3 = 22.77 | D3 = 3.11 | N2 = 1.68893 | $\nu2$ = 31.1 |
| R4 = 39.83 | D4 = Variable | | |
| R5 = 41.72 | D5 = 3.20 | N3 = 1.57135 | |
| R6 = −58.47 | D6 = 0.20 | | |
| R7 = 17.08 | D7 = 3.29 | N4 = 1.57135 | $\nu4$ = 53.0 |
| R8 = 86.35 | D8 = 1.93 | | |
| R9 = −54.28 | D9 = 3.14 | N5 = 1.84666 | $\nu5$ = 23.9 |
| R10 = 20.02 | D10 = 0.79 | | |
| R11 = 37.61 | D11 = 4.32 | N6 = 1.68893 | $\nu6$ = 31.1 |
| R12 = −27.42 | D12 = 1.64 | | |
| R13 = Stop | D13 = Variable | | |
| R14 = −30.00 | D14 = 4.81 | N7 = 1.68893 | $\nu7$ = 31.1 |
| R15 = −16.25 | D15 = 3.26 | | |
| R16 = −70.84 | D16 = 1.74 | N8 = 1.66672 | $\nu8$ = 48.3 |
| R17 = −71.15 | | | |

| Lens Separations during Zooming | | | |
|---|---|---|---|
| Focal Length | D4 | D13 | b.f. |
| 35.78 | 28.83 | 6.74 | 18.31 |
| 55.91 | 12.29 | 5.53 | 29.81 |
| 107.00 | 0.24 | 1.90 | 64.31 |

| | A | B | C |
|---|---|---|---|
| R3 | 2.978D-5 | −6.943D-6 | −2.661D-8 |
| | D | E | |
| | 4.975D-11 | −2.905D-13 | |
| | A' | B' | C' |
| | −5.434D-6 | 8.968D-8 | −5.298D-10 |
| | D' | | |
| | 2.249D-12 | | |
| | A | B | C |
| R16 | −3.497D-2 | −5.938D-5 | −1.356D-8 |
| | D | E | |
| | −5.547D-10 | 4.771D-12 | |
| | A' | B' | C' |
| | 2.158D-5 | 7.697D-7 | −2.059D-8 |
| | D' | | |
| | 1.551D-10 | | |

-continued

| F | G | H |
|---|---|---|
| −3.289D-13 | 1.870D-15 | −8.291D-19 |

In the embodiment described above, when changing over between the optical paths to the image pickup element 206, the mirror 304 has to be brought into, and taken out of, the cross point of these paths. Next, another embodiment which permits the changeover mirror to remain in the optical path is described on the basis of FIGS. 19(A) and 19(B).

A zoom lens (210, 211) forms an image on the image pickup element 206, and, when zooming, moves as indicated by arrows. This zooming range is not necessarily wider than the first zooming range of the photographic lens 101. Incidentally, the photographic lens system is the same as that shown in FIGS. 1(A) and 1(B) and its lens data is the same as that of the embodiment of FIGS. 1(A) and 1(B).

Figure 19A:
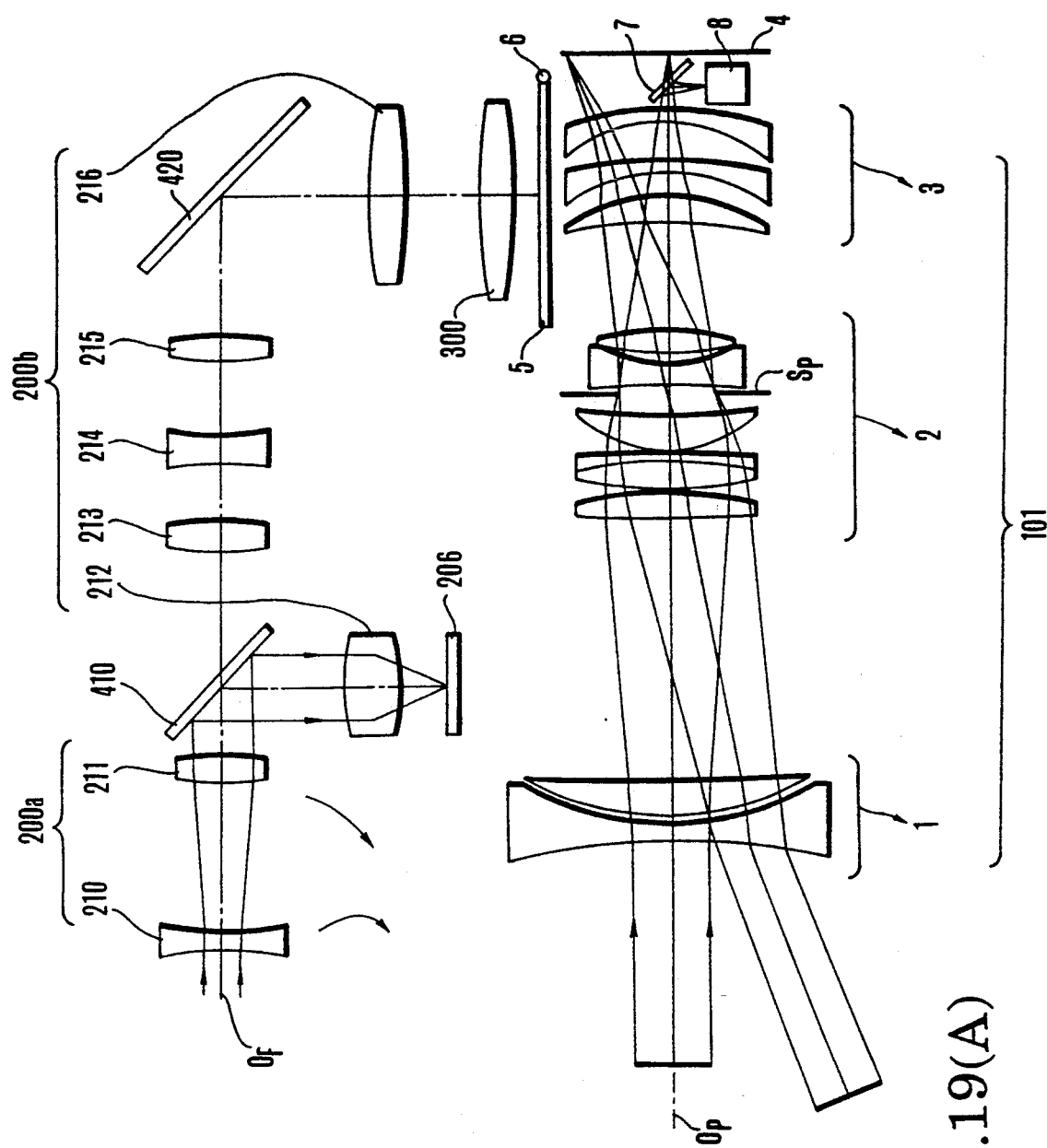
FIGS. 19(A) and 19(B) are diagrams illustrating the longitudinal section of lenses for another camera system concerning the invention with geometries of optical paths, particularly FIG. 19(A) being a geometry of the optical paths when the focal length is in the wide-angle end and FIG. 19(B) being a geometry of the optical paths when the focal length is in the telephoto end.

FIG. 19(A) shows the optical path through which the light from the photographic lens 101 goes to form an object image on the photosensitive surface 4 and the optical path through which the light from the photographic lens 200a goes to form an object image on a secondary image plane 206 with the help of a mirror 410 and a lens group 212.

Figure 19B:
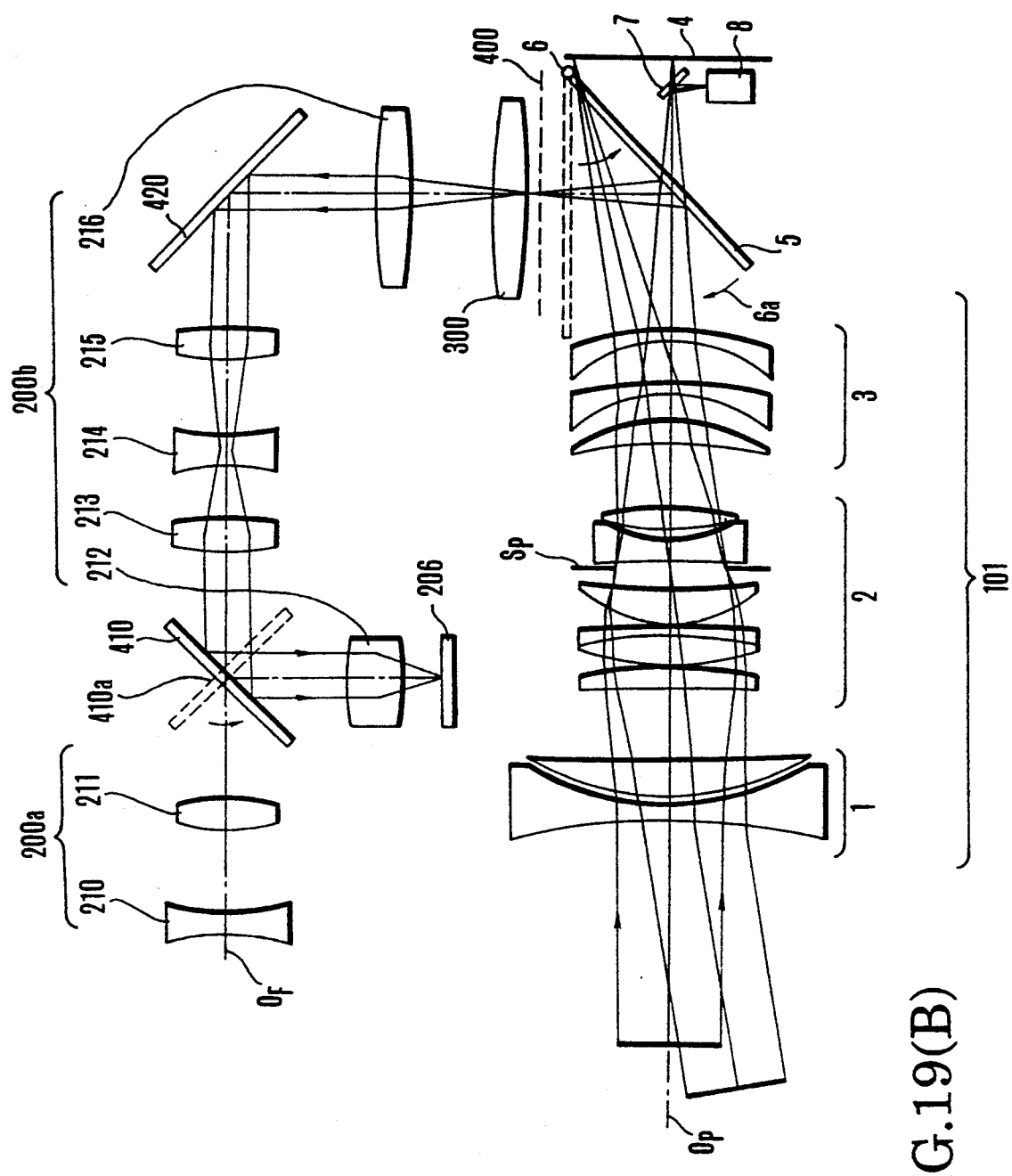

FIG. 19(B) shows the optical path through which the light from the photographic lens 101 goes to the mirror 5 to form an object image on a primary image plane 400, and light from this images is re-formed on the secondary image plane 206 by using a field lens 300 and a secondary image forming lens 200b.

In the present embodiment, when the camera system is used as a photographing system of short focal lengths as shown in FIG. 19(A), the mirror 5 is retracted from the optical path as shown in the same figure.

And, in FIG. 19(A), the light entering through the photographic lens 101 is solely used to expose the photosensitive surface 4 to the object image it forms thereon. For this mode, the photographic lens 101 varies its focal length in a first range of f=29-60 mm. Incidentally, when making the exposure, the mirror 7 is retracted out of the optical path.

Meanwhile, the photographic lens 200a and the lens group 212 are in operation to form an object image on the secondary image plane 206 in which the CCD is positioned. And, the image information is converted into electrical signals which are then processed for inverting the image vertically, horizontally to be used in, for example, the electronic viewfinder.

Even in the present embodiment, the camera system is so constructed that, when the photographic lens 101 is on the short focal length side, or in a first zooming range from the wide-angle end to the standard, the primary image plane or film plane and the secondary image plane or CCD plane are given respective object images.

Next, in the present embodiment, when using the photographic lens 101 as a photographing system of a long focal length range, or a second zooming range from the standard to the telephoto end, all the lens groups of the photographic lens 101 are moved from the positions of FIG. 19(A) toward the object side to thereby create a back space, and the mirror 5 is put into that space as shown in FIG. 19(B).

For this mode, the photographic lens 101 varies its focal length in a second range of f=60-130 mm. And, the rotatable mirror 5 is set in the optical path and at the same time the mirror 140 is rotated to the position shown by a solid line.

And, the photographic lens 101 forms the object image on the primary image plane 400 by means of the mirror 5. And, the object image formed on the primary image plane 400 is then re-formed on the secondary image plane 206 through the field lens 300 and the secondary image forming lens 200b. At this time, the second photographic lens is not used. Incidentally, at this time, the mirror 410 performs another function of blocking the light entering from the photographic lens 200a.

And, when exposing the photosensitive surface 4 to the object image formed by the photographic lens 101, the mirror 5 is retracted from the optical path and shutter means (not shown) is opened and closed.

In the present embodiment, the camera system is so constructed that, when the photographic lens 101 is in the long focal length or second zooming range, the object image can be formed on the arbitrarily selected one of the film plane and the CCD plane.

Also, in the present embodiment, the magnification relationship between the images at the primary image plane and the secondary image plane is adjusted by the suitable design of the secondary image forming lens so as to satisfy the image angle for the primary image plane. Thus, a good image angle relationship between both is held.

It is to be noted that in the present embodiment, the central portion of the mirror 5 is made half-mirrored so that a portion of the axial light beam is directed by the mirror 7 to the auto-focus unit 8.

Figure 20:
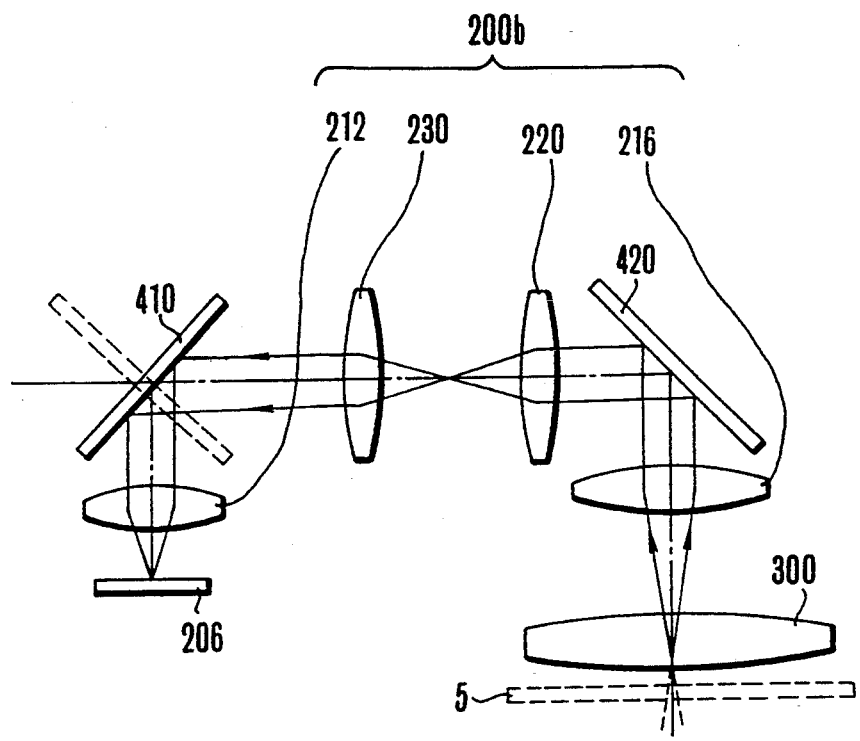
FIG. 20 is a longitudinal section view of an example of variation of the lens system 200b shown in FIGS. 19(A) and 19(B).

Also, in the present embodiment, the secondary image forming lens 200b may otherwise be formed so that an object image is once focused within that optical system as shown in FIG. 20. According to this, it becomes easy to put the directions of the object image formed by the photographic lens 200a and the object image formed by the secondary image forming lens 200b in coincidence with each other.

As is understood from the above, in the present embodiment, even with the photographic lens 101 constructed in the form of the high range zoom lens, because the short back focal distance suffices for the first zooming range, the size of the entire lens system can easily be reduced to a minimum.

Also, for the photographic lens 200a, there is no need to get as large a zoom ratio as that of the photographic lens 101, but it is only required that its zoom ratio is almost in the same order as that zoom ratio of the photographic lens 101 which is used when the mirror 5 is retracted from the optical path as shown in FIG. 19(A), or in the first zooming range.

For example, if, as the zoom ratio of the photographic lens 101 is 4-5 times, the first zooming range is 2 times, the zoom ratio for the photographic lens 200a is about 2 times. From this reason, the photographic lens 200a can be constructed to a very small size.

Besides this, by the proper design of the secondary image forming lens 200b, the object image formed on the primary image plane 400 can be re-formed on the secondary image plane 206 at an arbitrary magnification.

Particularly when the secondary image forming lens 200b is constructed from a zoom lens, the re-forming can be done with continuous variation of the magnification.

According to the invention, one zoom lens operates with selection with two image planes, namely, the film plane and the CCD plane. Compared with the camera system having two independent zoom lenses of each other, the size of the entire system can be reduced. Moreover, a camera system which enables the items of picture information from the two independent image planes to be selectively utilized can be achieved.

By this, it is made possible to achieve a camera system of such simple structure that, for example, usually the CCD at the secondary image plane is used to perform video photography. For that item of picture information which one wishes to have as a print, if the first imaging means has thus far been used, the mirror is then turned, or if the second imaging means has thus far been used, nothing is then done, before the image can be formed on the first image plane or the film plane.

Next, the last embodiment is described.

Figure 21A:
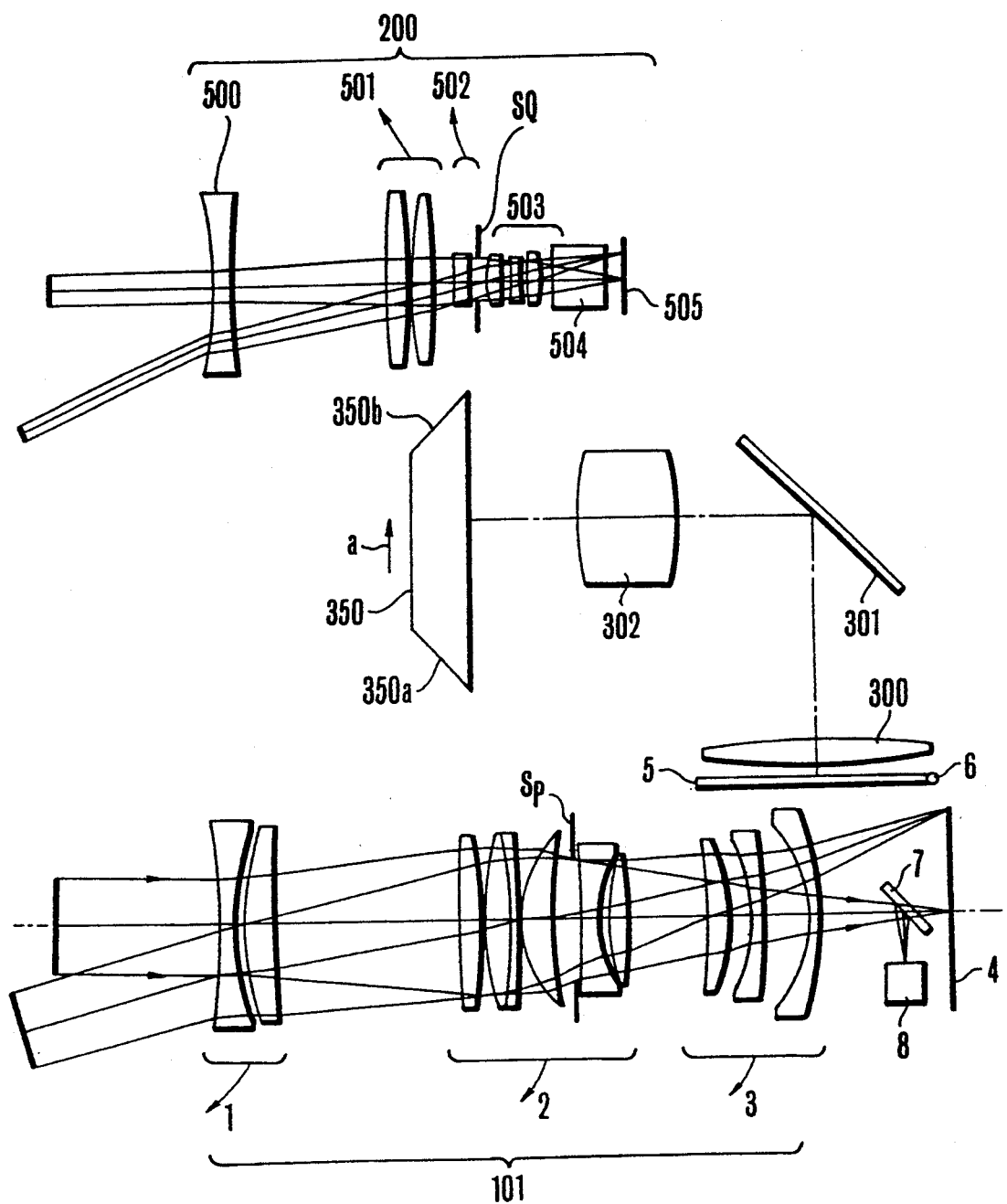
FIGS. 21(A) and 21(B) are diagrams illustrating the longitudinal section of lenses for another camera system concerning the invention with geometries of optical paths, particularly FIG. 21(A) being a geometry of the optical paths when the focal length is in the wide-angle end and FIG. 21(B) being a geometry of the optical paths when the focal length is in the telephoto end.

FIG. 21(A) shows the optical paths in which a second photographic lens 101 forms an image on the photosensitive surface 4, while a first photographic lens 200 forms an image on a photosensitive surface 505 such as a CCD.

Figure 21B:
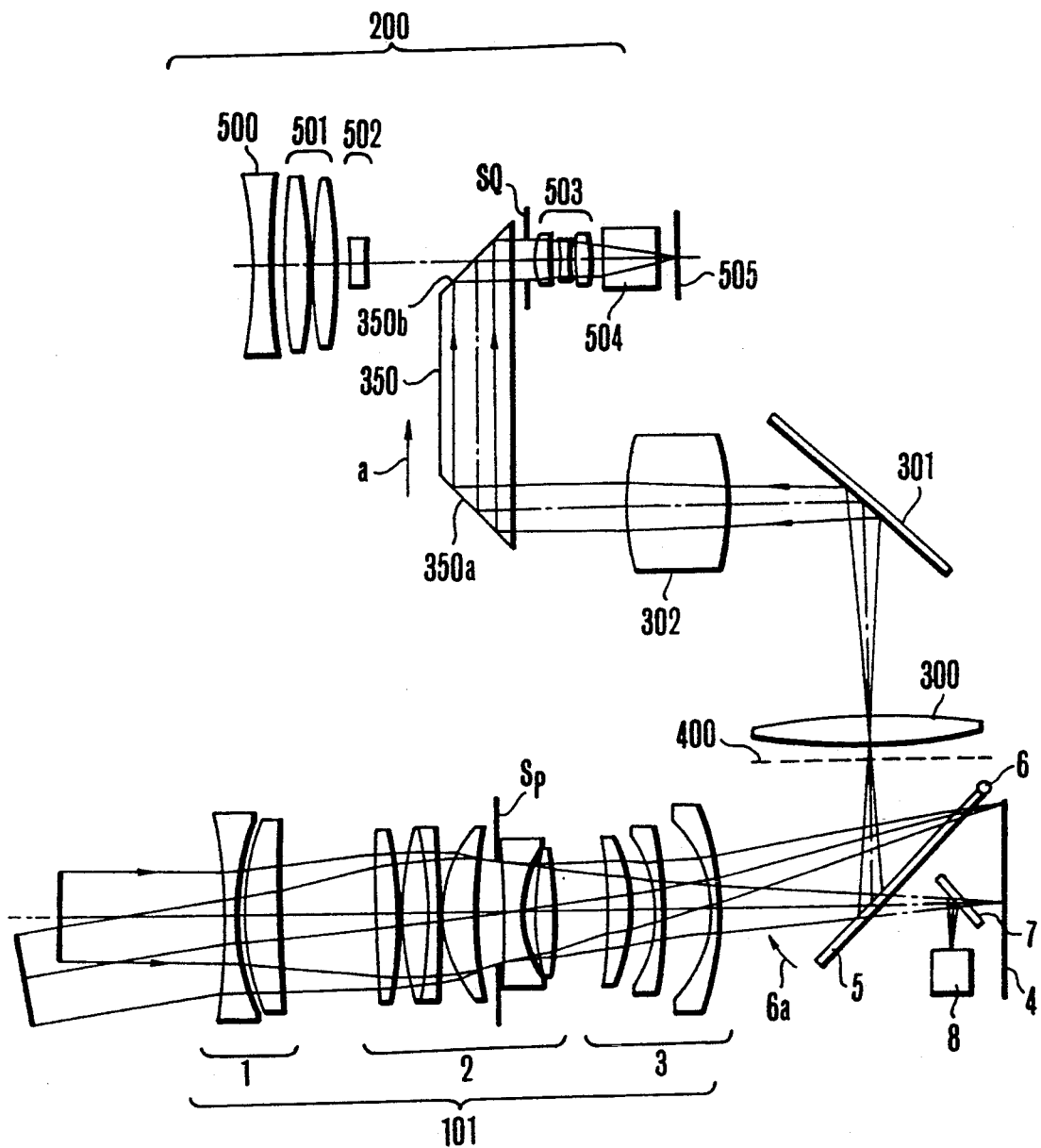

FIG. 21(B) shows the optical paths in which, when the photographic lens is in the telephoto position, the light of the photographic lens 101 is conducted to the photosensitive surface 505.

It is to be noted that the photographic lens 101 of the present embodiment, as shown in a numerical example to be described later, varies its focal length in a range of f=40.64-151.91 mm which corresponds to an image angle range of 2ω=56.1°-16.2°.

Meanwhile, the photographic lens 200 has a range of f=7.58-14.4 mm corresponding to an image angle range of 2ω=56.6°-31°.

In FIGS. 21(A) and 21(B), the photographic lens 200 is provided independently of the second photographic lens 101 and comprises a zoom section having a first lens group 500 of negative refractive power, a second lens group 501 of positive refractive power, a third lens group 502 of negative refractive power, an aperture stop SQ and a relay section 503. Reference numeral 504 denotes a filter or like member.

And, in the present embodiment, as shown in FIG. 21(A), when the photographic lens 101 is in a wide-angle region, the first photographic lens 200 and the photographic lens 101 are selectively used in the independent form of each other.

Meanwhile, when the photographic lens is in a telephoto region, as shown in FIG. 21(B), the object image by the photographic is formed through the mirror 5 on the first image plane 400. And, the object image formed on the first image plane 400 is re-formed on the second image plane 505 through a field lens 300 and a secondary image forming system (301, 302, 350, 503). Incidentally, a portion 350b of a reflection member 305 performs a function of blocking the light beam from the photographic lens 200.

And, when exposing the photosensitive surface 4 to the object image formed by the photographic lens 101, the mirror 5 is retracted from the optical path and shutter means (not shown) is opened and closed.

In the present embodiment, the camera system is so constructed that, when the photographic lens 101 is in the long focal length range or second zooming range, the object image can be formed with selection of the film plane and the CCD plane.

Lens groups 302 and 503 constitute the secondary image forming system by which the object image formed on the first image plane 400 is re-formed on the second image plane 505 comprised of the CCD with the use of a fixed mirror 301 and a movable reflection member 350.

The reflection member 350 is able to slide and consists of a prism block having its slant faces 350a and 350b made totally reflective. It moves like an arrow "a" in response to changeover between the first imaging means and the second imaging means, entering into and exiting from the optical axis.

And, in the present embodiment too, the camera system is so constructed that, when the second photographic lens 101 is on the short focal length side, or in the first zooming range from the wide-angle end to the standard, the object images are formed on both of the first image plane or film plane and the second image plane or CCD plane.

Also, in the present embodiment, when using the photographic lens 101 in the long focal length range or the second zooming range from the standard to the telephoto end, all the lens groups of the photographic lens 101 are moved from the positions of FIG. 21(A) toward the object side to thereby create a space in the place particularly the third lens group 3 has occupied before, and the mirror 5 is set in that space as shown in FIG. 21(B).

Also, the lens groups 501 and 502 of the second photographic lens 200 are moved to vary the image magnification in response to zooming movement of the photographic lens 101 from the wide-angle end to the intermediate focal length position. Into the thus-formed space, the reflection member 350 is inserted.

It is to be noted that for this mode the photographic lens 101 in the numerical example to be described later is used in a second zooming range of f=66.53-151.91 mm. And, the rotatable mirror 5 is set in the optical path and at the same time the reflection mirror 350 is moved to the position in the optical path as shown in FIG. 21(B).

In the present embodiment, the image magnification β of the secondary image forming system (301, 302, 350, 503) is made to fall in the following magnification relationship:

β=(Image Size at Second Image Plane 505)/(Image Size at First Image Plane 400)

Therefore, by inserting the mirror 5 and the reflection member 350 into the optical paths, the image pickup means such as a CCD in the second image plane 505 can continuously use the range of f=7.58-28.08 mm.

Here, the image angle range of the photographic lens 101 of FIG. 21(A) is 56.1°-16.2°. This is, therefore, included in the range of the photographic lens 200.

It is to be noted that in the present embodiment, the central portion of the mirror 5 may be made half-mirrored so that a portion of the axial light beam is conducted through the mirror 7 to the auto-focus unit 8.

As is understood from the above description, in the present embodiment, despite the construction of the photographic lens 101 from a high range zoom lens, because of the peculiar features that the short back focal distance suffices for the first zooming range, a great advantage is produced that the size of the entire lens system can easily be reduced to a minimum.

Also, the photographic lens 200 does not necessitate so high a zoom ratio as that of the photographic lens 101, but it is only required that its zoom ratio is almost of the same order as the zoom ratio of the photographic lens 101 which is used when the mode where the mirror 5 is retracted from the optical path operates, or when in the first zooming range.

For example, if, as the photographic lens 101 has a zoom ratio of 4 or 5, the first zooming range is 2, the photographic lens 200 may be constructed so as to have a zoom ratio of about 2. From this reason, the photographic lens 200 can be formed to a very small size.

Besides this, by the suitable design of the secondary image forming system (301, 302, 350, 503), the object image formed on the first image plane can be re-formed on the second image plane 505 at an arbitrary magnification.

Particularly when the secondary image forming system is constructed from a zoom lens, the re-forming can be done at any arbitrary magnification in a continuous range of variation. Also, the zoom magnification at the second image plane 505 can be made larger than the zoom magnification at the first image plane 400.

It should be noted that the lens types to be used in photographic lens 101 and the photographic lens 200 according to the invention are not confined to those shown in FIGS. 21(A) and 21(B), but any other types of zoom lenses may be used instead.

Figure 22:
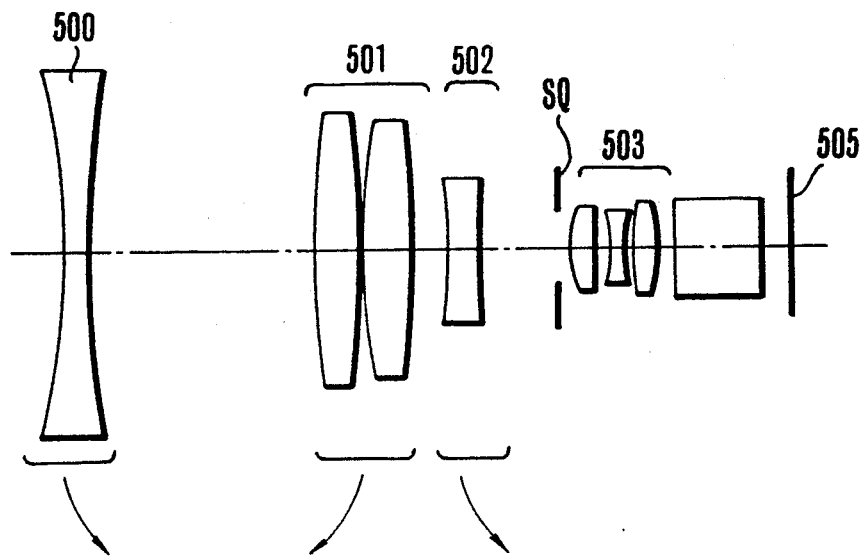
FIGS. 22 and 23 are block diagrams of a first photographic lens according to the invention.
Figure 23:
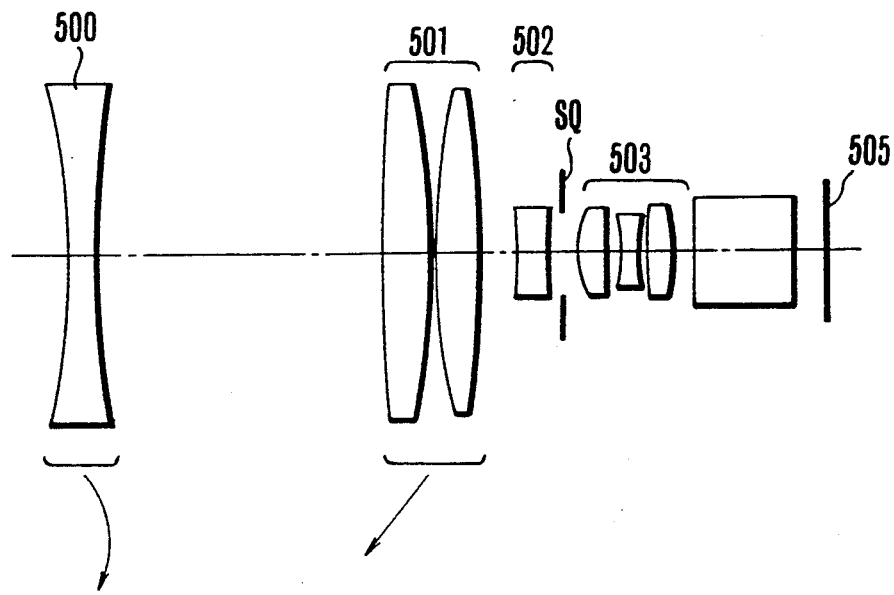

FIG. 22 and FIG. 23 are schematic diagrams of the optical systems of second and third numerical examples of the photographic lens 200 of the invention. In the second numerical example of FIG. 22, the zoom section is constructed from three lens groups 500, 501 and 502, and these lens groups are moved like arrows to vary the focal length from the wide-angle end to the telephoto end. In the third numerical example of FIG. 23, two of the lens groups, namely, the lens group 500 of negative refractive power and the lens group 501 of positive refractive power are moved like arrows to vary the focal length from the wide-angle end to the telephoto end.

Numerical examples of the photographic lens 101 and the photographic lens 200 according to the invention are shown in the following tables, where Ri is the radius of curvature of the i-th lens surface, counting from front, Di is the i-th axial lens thickness or air separation, counting from front and Ni and νi are respectively the refractive index and Abbe number of the glass of the i-th lens element, counting from front. "b.f." stands for the back focal distance.

Photographic Lens 101:
F = 40.64-151.91 FNo = 1:3.5-9 2ω = 56.1°-16.2°

| | | |
|---|---|---|
| R1 = −80.11 | D1 = 1.50 | N1 = 1.88300 ν1 = 40.8 |
| R2 = 29.54 | D2 = 1.00 | |
| R3 = 30.97 | D3 = 4.00 | N2 = 1.75604 ν2 = 25.0 |
| R4 = 257.00 | D4 = Variable | |
| R5 = 3933.61 | D5 = 2.73 | N3 = 1.49700 ν3 = 81.6 |
| R6 = −48.78 | D6 = 0.16 | |
| R7 = 37.29 | D7 = 3.21 | N4 = 1.51742 ν4 = 52.4 |
| R8 = −43.14 | D8 = 1.07 | N5 = 1.84666 ν5 = 23.9 |
| R9 = −319.03 | D9 = 0.16 | |
| R10 = 14.79 | D10 = 3.78 | N6 = 1.61700 ν6 = 62.8 |
| R11 = 58.58 | D11 = 2.63 | |
| R12 = Stop | D12 = 0.72 | |
| R13 = −166.77 | D13 = 1.98 | N7 = 1.83400 ν7 = 37.2 |
| R14 = 14.41 | D14 = 1.25 | |
| R15 = 26.49 | D15 = 2.73 | N8 = 1.62045 ν8 = 38.1 |
| R16 = −37.73 | D16 = Variable | |
| R17 = −52.47 | D17 = 3.00 | N9 = 1.59270 ν9 = 35.3 |
| R18 = −18.10 | D18 = 2.44 | |
| R19 = −17.55 | D19 = 1.20 | N10 = 1.72916 ν10 = 54.7 |
| R20 = −61.72 | D20 = 5.26 | |
| R21 = −15.45 | D21 = 1.20 | N11 = 1.48749 ν11 = 70.2 |
| R22 = −35.11 | | |

Lens Separations during Zooming

| Focal Length | D4 | D16 | b.f. |
|---|---|---|---|
| 40.64 | 21.98 | 9.34 | 14.52 |
| 66.53 | 11.71 | 5.98 | 32.84 |
| 151.91 | 2.16 | 1.84 | 91.2 |

First Numerical Example of Photographic Lens 200:
F = 7.58-14.4 FNo = 1:2 2ω = 55.6°-31°

| | | |
|---|---|---|
| R1 = −45.00 | D1 = 1.80 | N1 = 1.69680 ν1 = 55.5 |
| R2 = 69.73 | D2 = Variable | |
| R3 = 80.00 | D3 = 3.00 | N2 = 1.69680 ν2 = 55.5 |
| R4 = −70.00 | D4 = 0.20 | |
| R5 = 55.00 | D5 = 3.00 | N3 = 1.69680 ν3 = 55.5 |
| R6 = −71.21 | D6 = Variable | |
| R7 = −35.00 | D7 = 1.80 | N4 = 1.51633 ν4 = 64.1 |
| R8 = 46.41 | D8 = Variable | |
| R9 = Stop | D9 = 1.00 | |
| R10 = 7.56 | D10 = 1.92 | N5 = 1.77250 ν5 = 49.6 |
| R11 = ∞ | D11 = 1.08 | |
| R12 = −12.96 | D12 = 1.08 | N6 = 1.80518 ν6 = 25.4 |
| R13 = 10.80 | D13 = 0.54 | |
| R14 = 18.36 | D14 = 2.16 | N7 = 1.83400 ν7 = 37.2 |
| R15 = −9.28 | D15 = 1.08 | |
| R16 = ∞ | D16 = 6.48 | N8 = 1.51633 ν8 = 64.1 |
| R17 = ∞ | | |

Lens Separations during Zooming

| Focal Length | D2 | D6 | D8 |
|---|---|---|---|
| 7.58 | 18.40 | 2.15 | 1.00 |
| 10.61 | 8.40 | 9.29 | 3.86 |
| 14.40 | 1.82 | 18.22 | 1.51 |

Second Numerical Example of Photographic Lens 200:
F = 7.50-15 FNo = 1:2 2ω = 56.1°-29.86°

| | | |
|---|---|---|
| R1 = −45.00 | D1 = 1.80 | N1 = 1.69680 ν1 = 55.5 |
| R2 = 69.73 | D2 = Variable | |
| R3 = 120.00 | D3 = 3.00 | N2 = 1.69680 ν2 = 55.5 |
| R4 = −60.00 | D4 = 0.20 | |
| R5 = 50.00 | D5 = 3.00 | N3 = 1.69680 ν3 = 55.5 |
| R6 = −72.47 | D6 = Variable | |
| R7 = −35.00 | D7 = 1.80 | N4 = 1.51633 ν4 = 64.1 |
| R8 = 46.41 | D8 = 0.8 | |
| R9 = Stop | D9 = 0.99 | |
| R10 = 7.48 | D10 = 1.90 | N5 = 1.77250 ν5 = 49.6 |
| R11 = ∞ | D11 = 1.07 | |
| R12 = −12.83 | D12 = 1.07 | N6 = 1.80518 ν6 = 25.4 |
| R13 = 10.69 | D13 = 0.53 | |
| R14 = 18.17 | D14 = 2.14 | N7 = 1.83400 ν7 = 37.2 |
| R15 = −9.19 | D15 = 1.07 | |
| R16 = ∞ | D16 = 6.42 | N8 = 1.51633 ν8 = 64.1 |
| R17 = ∞ | | |

Lens Separations during Zooming

| Focal Length | D2 | D6 |
|---|---|---|
| 7.50 | 18.29 | 2.28 |
| 11.25 | 6.62 | 11.21 |
| 15.00 | 0.79 | 20.14 |

Third Numerical Example of Photographic Lens 200:
F = 7.52-12.15 FNo = 1:2 2ω = 56°-36.4°

| | | |
|---|---|---|
| R1 = −45.00 | D1 = 1.80 | N1 = 1.69680 ν1 = 55.5 |
| R2 = 91.13 | D2 = Variable | |
| R3 = 80.00 | D3 = 3.00 | N2 = 1.69680 ν2 = 55.5 |
| R4 = −70.00 | D4 = 0.20 | |
| R5 = 55.00 | D5 = 3.00 | N3 = 1.69680 ν3 = 55.5 |
| R6 = −71.21 | D6 = Variable | |
| R7 = −35.00 | D7 = 1.80 | N4 = 1.51633 ν4 = 64.1 |
| R8 = 46.41 | D8 = Variable | |
| R9 = Stop | D9 = 0.90 | |
| R10 = 6.80 | D10 = 1.72 | N5 = 1.77250 ν5 = 49.6 |
| R11 = ∞ | D11 = 0.97 | |
| R12 = −11.66 | D12 = 0.97 | N6 = 1.80518 ν6 = 25.4 |
| R13 = 9.72 | D13 = 0.49 | |
| R14 = 16.52 | D14 = 1.94 | N7 = 1.83400 ν7 = 37.2 |
| R15 = −8.36 | D15 = 0.97 | |

-continued

| | | | |
|---|---|---|---|
| R16 = ∞ | D16 = 5.83 | N8 = 1.51633 | ν8 = 64.1 |
| R17 = ∞ | | | |

Lens Separations during Zooming

| Focal length | D2 | D6 | D8 |
|---|---|---|---|
| 7.52 | 14.34 | 2.15 | 5.00 |
| 9.84 | 6.10 | 7.65 | 3.00 |
| 12.15 | 1.00 | 13.15 | 1.00 |

According to the present invention, a camera system is achieved in which with the use of one zoom lens of high range, the object image can be formed selectively on both of two image planes, or the film plane and CCD plane. This enables one of the two zoom lenses to be reduced to a smaller size than when the camera system has two independent zoom lenses. Therefore, the size of the entire system can be reduced. Moreover, the items of picture information from the two independent image planes can be utilized by choice.

What is claimed is:

1. A camera system comprising:
    an eyepiece having an eyepiece lens;
    a lens group having a plurality of lenses to direct an image along a first optical axis toward said eyepiece;
    objective lens means for forming an image, including at least one movable lens arranged to move between a telephoto mode and a wide angle mode along a second optical axis toward a focal plane;
    main reflex means arranged to be inserted into a changeable space on said second optical axis produced when said movable lens has moved to said telephoto mode, and to be removed from the changeable space on said second optical axis when said movable lens has moved to said wide angle mode, wherein when inserted, said reflex mean bends an optical path of said objective lens means; and
    sub-reflex means for reflecting a light beam bent by said main reflex means in a direction along said first optical axis toward said eyepiece.

2. A camera system according to claim 1, wherein said movable lens is positioned at the most image side and moves toward the object side along said second optical axis for zooming from the wide-angle end to the telephoto end.

3. A camera system according to claim 2, wherein said main reflex means is inserted into a space between an image of said objective lens means and said movable lens.

4. A camera system according to claim 2, wherein said lens group comprises, from front to rear, a first lens group having a positive refractive power to form an image, and a second lens group having a positive refractive power to re-form the image of said first lens group.

5. A camera system according to claim 4, wherein said sub-reflex means includes, in the direction in which light advances, a first reflex member having roof faces and a second reflex member for reflecting light reflected by said first reflex member toward said eyepiece lens.

6. A camera system according to claim 5, wherein said second reflex member is inserted into said first optical axis in response to insertion of said main reflex means into the optical path of said objective lens means.

7. A camera system according to claim 4, wherein said first lens group and said second lens group move along said first optical axis for zooming.

8. A camera system according to claim 7, wherein said sub-reflex means includes, in the direction in which light advances, a first reflex member having roof faces and a second reflex member for reflecting light reflected by said first reflex member toward said eyepiece lens.

9. A camera system according to claim 8, wherein said second reflex member is inserted into said first optical axis in response to insertion of said main reflex means into the optical path of said objective lens means.

10. A camera system according to claim 1, further comprising supplementary lens means arranged to be inserted into a space created by movement of said movable lens toward the object side for varying the image magnification, and wherein said main reflex means is inserted into a space behind said supplementary lens means.

11. A camera system according to claim 10, wherein said lens group comprises a lens unit having a negative refractive power and said eyepiece lens has a positive refractive power.

12. A camera system according to claim 11, wherein said sub-reflex means includes, in the direction in which light advances, a first reflex member having roof faces and a second reflex member for reflecting light reflected by said first reflex member toward said eyepiece lens.

13. A camera system according to claim 10, wherein said lens group comprises a first lens group having a positive refractive power and said eyepiece lens has a positive refractive power.

14. A camera system according to claim 13, wherein said sub-reflex means includes, in the direction in which light advances, a first reflex member having roof faces, and a second reflex member for reflecting light toward said eyepiece lens.

15. A camera system according to claim 1, wherein said movable lens is a lens for performing the focusing function, and moves toward the object side when focusing to a close object, and said main reflex means is inserted into a space between said movable lens and an image of said objective lens means.

16. A camera system according to claim 15, wherein said lens group comprises a first lens unit having a positive refractive power and said eyepiece lens has a positive refractive power.

17. A camera system according to claim 16, wherein said sub-reflex means includes, in the direction in which light advances, a first reflex member having roof faces and a second reflex member for reflecting light reflected by said first reflex member toward said eyepiece lens.

18. A camera system according to claim 1, wherein said lens group has a positive refractive power as a whole and forms an optical image.

19. A camera system according to claim 18, further comprising a photoelectric transducer element positioned in a prescribed image plane of said lens group.

20. A camera system according to claim 19, wherein said lens group includes a plurality of lens units movable along the first optical axis at least for zooming.

21. A camera system according to claim 1, further comprising detecting means for detecting a focus adjustment state of said objective lens means means and a reflex member arranged in between said main reflex member and an image of said objective lens means to conduct a light beam of said objective lens means to said detecting means.

22. A camera system comprising:
an eyepiece;
a lens group having a plurality of lenses to direct an image along a first optical axis toward said eyepiece;
objective lens means for forming an image, including at least one movable lens arranged to move between a telephoto mode and a wide angle mode along a second optical axis toward a focal plane;
main reflex means arranged to be inserted into and retracted from said second optical axis in association with movement of said movable lens, said main reflex means arranged to be inserted into a changeable space on said second optical axis produced when said movable lens has moved to said telephoto mode, and to be removed from the changeable space on said second optical axis when said movable lens has moved to said wide angle mode, wherein when inserted, said reflex mean bends an optical path of said objective lens means; and
a plurality of reflex members for reflecting a light beam of said objective lens reflected by said main reflex mean in a direction along said first optical axis toward said eyepiece.

23. A camera system according to claim 22, wherein said movable lens is positioned at the most image side and moves toward the object side along said second optical axis for zooming from the wide-angle end to the telephoto end.

24. A camera system according to claim 23, wherein said main reflex means is inserted into a space between an image of said objective lens means and said movable lens.

* * * * *

UNITED STATES PATENT AND TRADEMARK OFFICE
CERTIFICATE OF CORRECTION

PATENT NO. : 5,319,405
DATED : June 7, 1994
INVENTOR(S) : Keiji IKEMORI

It is certified that error appears in the above-indentified patent and that said Letters Patent is hereby corrected as shown below:

ON COVER PAGE:

AT [30] Under Heading "Foreign Application Priority Data":
Line 10, "Nov. 24, 1989 [JP] Japan ........ 1-196293" should read --Nov. 24, 1989 [JP] Japan ........ 1-306293--.

COLUMN 2:
Line 63, "compensate" should read --compensates--.

COLUMN 5:
Line 12, "reflects" should read --and reflects--.

COLUMN 8:
Line 28, "regions" should read --region--.

COLUMN 9:
Line 21, "TT1 should read --TT1--.

COLUMN 17:
Line 17, "aberration" should read --abberations--.

COLUMN 19:
Line 47, "slidden" should read --slid--.

COLUMN 20:
Line 29, "osculating" should read --oscillating--.

COLUMN 27:
Line 38, "mean" should read --means--.

UNITED STATES PATENT AND TRADEMARK OFFICE
CERTIFICATE OF CORRECTION

PATENT NO. : 5,319,405
DATED : June 7, 1994
INVENTOR(S) : Keiji IKEMORI

It is certified that error appears in the above-indentified patent and that said Letters Patent is hereby corrected as shown below:

<u>COLUMN 30</u>:
    Line 3, "mean" should read --means--;
    Line 7, "mean" should read --means--.

Signed and Sealed this

Eighteenth Day of April, 1995

*Attest:*

BRUCE LEHMAN

*Attesting Officer*     *Commissioner of Patents and Trademarks*